United States Patent [19]
Box et al.

[11] Patent Number: 5,787,271
[45] Date of Patent: Jul. 28, 1998

[54] SPARE CAPACITY ALLOCATION TOOL

[75] Inventors: Jay C. Box, Garland; Sridhar S. Nathan, Plano, both of Tex.

[73] Assignee: MCI Corporation, Washington, D.C.

[21] Appl. No.: 670,886

[22] Filed: Jun. 26, 1996

[51] Int. Cl.$^6$ .......................... G06F 9/455; H04L 12/24
[52] U.S. Cl. .............. 395/500; 395/200.71; 395/200.69; 395/200.7; 395/200.74; 370/225; 370/226; 370/227; 370/228; 370/238; 370/255; 364/578
[58] Field of Search ........... 395/200.71, 200.68–200.69, 395/200.7, 200.72–200.74, 200.15, 200.13, 200.01, 527, 500; 340/825.01, 825.03, 826–827, 825.08, 825.79, 825.8; 370/216–217, 225–229, 235, 238, 351, 352, 355, 357, 254, 255, 386, 389, 398, 400, 409, 422, 431, 437, 443, 444; 379/219–222, 242, 272, 273, 271; 364/242.94, DIG. 1–DIG. 2, 514 C, 514 R, 578

[56] References Cited

U.S. PATENT DOCUMENTS

| | | | |
|---|---|---|---|
| 4,956,835 | 9/1990 | Grover | 370/228 |
| 5,235,599 | 8/1993 | Nishimura et al. | 395/182.02 |
| 5,459,716 | 10/1995 | Fahim et al. | 370/228 |
| 5,481,604 | 1/1996 | Minot | 379/221 |
| 5,491,690 | 2/1996 | Alfonsi et al. | 370/404 |
| 5,537,532 | 7/1996 | Chng et al. | 395/182.02 |
| 5,590,119 | 12/1996 | Moran et al. | 370/225 |
| 5,623,481 | 4/1997 | Russ et al. | 370/225 |
| 5,627,971 | 5/1997 | Miernik | 395/200.71 |
| 5,646,936 | 7/1997 | Shah et al. | 370/228 |
| 5,657,320 | 8/1997 | Russ et al. | 370/217 |
| 5,659,796 | 8/1997 | Thorson et al. | 395/200.71 |

OTHER PUBLICATIONS

"A Self-Healing Network with An Economical Spare-Channel Assignment" By Sakauchi et al.; IEEE CH2827, pp. 0438–0443, Apr. 1990.

Murty, Katta G., Network Programming. "Multicommodity Flow Problems", Chapter 5, Section 5.11, pp. 365–368, 384, 386 Prentice Hall (1992).

"Fast Approximation Algorithms for Multicommodity Flow Problems," Journal of Computer and System Sciences 50, 228–243 (1995).

"A Survey of Linenar Cost Multicommodity Network Flows," Operations Research, vol. 26, No. 2, 209–236 Mar.–Apr. (1978).

"Multicommodity Network Flows—A Survey," Networks, vol. 8 37–91 (1978).

"Fast Approximation Algorithm for Minimum Cost Multicommodity Flow," http://elib.stanford.edu/TR/STAN:C-S-TN-95-19, Kamath, A. et al., 1–15, Mar. 1995.

Primary Examiner—Emanuel T. Voeltz
Assistant Examiner—Tuan Q. Dam

[57] ABSTRACT

An apparatus and method is described that is used to design a minimal spares network for a given communications network. Three data files are used as input which describe the communications network. The information comprising such data files include the number and configuration of the nodes and spans, the current demand in terms of the required capacity between the source and destination nodes, current spare capacity (if any), and optionally current paths used to carry the demand traffic (including the presence or absence of glass-throughs). A three pass method is used to design an efficient and economical spares network from the given input data. A simulated cut is performed on each span in the communications network. From each simulated span cut, the affected demand traffic is identified and rerouted via spare capacity that is 'purchased' on an incremental cost basis. Pre-purchased spares are used before new spares are purchased.

28 Claims, 17 Drawing Sheets

202 Input files

304 Node Data File

| # | Node |
|---|------|
| 0 | 102a |
| 1 | 102b |
| 2 | 102c |
| 3 | 102d |
| 4 | 102e |
| 5 | 102f |
| 6 | 102g |
| 7 | 102h |
| 8 | 102i |
| 9 | 102j |

306 Span Data File

| # | Span | Length |
|---|------|--------|
| 0 | 102g-102j | 46 |
| 1 | 102a-102j | 109 |
| 2 | 102f-102g | 38 |
| 3 | 102f-102j | 32 |
| 4 | 102b-102j | 53 |
| 5 | 102a-102b | 79 |
| 6 | 102c-102i | 77 |
| 7 | 102b-102c | 390 |
| 8 | 102i-102h | 58 |
| 9 | 102c-102d | 51 |
| 10 | 102d-102e | 35 |
| 11 | 102e-102h | 16 |
| 12 | 102e-102f | 371 |
| 13 | 102d-102h | 23 |

FIG. 3A

202 Input files

| # | Src/Dst | Dmd | Routing Information (Optional) |
|---|---|---|---|
| 0 | 102a*-102g* | 1 | 102a*-102b-102c-102d-102e-102f-102g* |
| 1 | 102e*-102i* | 1 | 102e*-102h-102i* |
| 2 | 102j*-102g* | 2 | 102j*-102g* |
| 3 | 102j*-102a* | 2 | 102j*-102a* |
| 4 | 102e*-102h* | 3 | 102e*-102h* |
| 5 | 102h*-102i* | 1 | 102h*-102i* |
| 6 | 102e*-102f* | 1 | 102e*-102f* |
| 7 | 102e*-102g* | 1 | 102e*-102d-102c-102b-102j-102g* |
| 8 | 102e*-102a* | 1 | 102e*-102d-102c-102b-102a* |
| 9 | 102j*-102i* | 1 | 102j*-102b-102c-102i* |
| 10 | 102i*-102a* | 1 | 102i*-102h-102e-102d-102c-102b-102a* |
| 11 | 102e*-102d* | 2 | 102e*-102h-102d* |
| 12 | 102b*-102j* | 2 | 102b*-102j* |
| 13 | 102a*-102b* | 2 | 102a*-102b* |
| 14 | 102h*-102g* | 1 | 102h*-102e-102f-102g* |
| 15 | 102i*-102d* | 2 | 102i*-102h-102d* |
| 16 | 102j*-102f* | 2 | 102j*-102f* |
| 17 | 102c*-102d* | 2 | 102c*-102d* |
| 18 | 102f*-102g* | 2 | 102f*-102g* |
| 19 | 102e*-102a* | 1 | 102e*-102f-102j-102b-102a* |
| 20 | 102j*-102a* | 2 | 102j*-102b-102a* |
| 21 | 102j*-102d* | 2 | 102j*-102b-102c-102d* |
| 22 | 102e*-102a* | 2 | 102e*-102f-102j-102a* |
| 23 | 102e*-102g* | 1 | 102e*-102f-102j-102g* |
| 24 | 102e*-102g* | 1 | 102e*-102h-102i-102c-102b-102j-102g* |
| 25 | 102j*-102i* | 2 | 102j*-102f-102e-102h-102i* |
| 26 | 102b*-102i* | 2 | 102b*-102c-102i* |
| 27 | 102f*-102g* | 1 | 102g*-102j-102g* |
| 28 | 102i*-102a* | 1 | 102i*-102c-102b-102a* |
| 29 | 102i*-102a* | 1 | 102i*-102c-102b-102j-102a* |
| 30 | 102a*-102g* | 2 | 102a*-102j-102f-102g* |
| 31 | 102e*-102d* | 96 | 102e*-102d* |

308 Demand Data File

FIG. 3B

214 Output Files

416 Spares Network Data File

| # | Span | No. Spares |
|---|---|---|
| 0 | 102a-102b | 7 |
| 1 | 102a-102j | 9 |
| 2 | 102b-102c | 9 |
| 3 | 102b-102j | 2 |
| 4 | 102c-102i | 7 |
| 5 | 102c-102d | 4 |
| 6 | 102i-102h | 5 |
| 7 | 102d-102e | 6 |
| 8 | 102d-102h | 96 |
| 9 | 102e-102f | 11 |
| 10 | 102e-102h | 96 |
| 11 | 102f-102g | 9 |
| 12 | 102j-102f | 2 |
| 13 | 102j-102g | 8 |

FIG. 4A

418 Demand Restoral Data File

| | Affected Demand | Restoral Path | No.DS-3s |
|---|---|---|---|
| CutSite (0)<br>- Span #13<br>(102d-102h) | 15 102i-102d | 102i-102c-102d | 2 |
| | 11 102e-102d | 102e-102d | 2 |
| | 26 102b-102i | 102b-102c-102d-102h-102i | 2 |
| CutSite (1)<br>- Span #6<br>(102c-102i) | 28 102i-102a | 102i-102h-102e-102f-102j-102a | 1 |
| | 9 102j-102i | 102j-102f-102e-102h-102i | 2 |
| | 29 102i-102a | 102i-102h-102c-102b-102a | 1 |
| | 24 102e-102g | 102e-102f-102g | 2 |
| ... | | | |
| CutSite(13)<br>- Span # 10<br>(102d-102e) | 31 102e-102d | 102e-102h-102d | 96 |
| | 8 102e-102a | 102e-102f-102j-102a | 1 |
| | 7 102e-102g | 102e-102f-102g | 1 |
| | 10 102i-102a | 102i-102c-102b-102a | 1 |
| | 0 102a-102g | 102a-102j-102g | 1 |

420 Summary Data File

| # | Span | Demands (# DS-3s / Total # miles) | Spares (# DS-3s / Total # miles) |
|---|---|---|---|
| 0 | 102g-102j | 7/322 | 8/368 |
| 1 | 102a-102j | 7/763 | 9/981 |
| 2 | 102f-102g | 7/266 | 9/342 |
| 3 | 102f-102j | 12/384 | 2/64 |
| 4 | 102b-102j | 11/583 | 2/106 |
| 5 | 102a-102b | 9/711 | 7/553 |
| 6 | 102c-102i | 6/462 | 7/539 |
| 7 | 102b-102c | 12/4680 | 9/3510 |
| 8 | 102i-102h | 8/464 | 5/290 |
| 9 | 102c-102d | 8/408 | 4/204 |
| 10 | 102d-102e | 100/3500 | 6/210 |
| 11 | 102e-102h | 12/192 | 96/1536 |
| 12 | 102e-102f | 10/3710 | 11/4081 |
| 13 | 102d-102h | 4/92 | 96/2208 |

Total - Revenue Network DS-3s - 16,537 miles
Total - Spares Network DS-3s - 14,992 miles
Ratio - Spares/Revenue = 90.7 %

FIG. 4C

702 Set of cutsite lists

| CutSite (0)<br>- Span #13<br>(102d-102h) | Affected Demand | | No. DS-3s | Affected Restoration Resource |
|---|---|---|---|---|
| | 15 | 102i-102d | 2 | — |
| | 11 | 102e-102d | 2 | — |

704a

| CutSite (1)<br>- Span # 6<br>(102c-102i) | | | | |
|---|---|---|---|---|
| | 26 | 102b-102i | 2 | — |
| | 28 | 102i-102a | 1 | — |
| | 9 | 102j-102i | 2 | — |
| | 29 | 102i-102a | 1 | — |
| | 24 | 102e-102g | 2 | — |

704b

. . .

| CutSite(13)<br>- Span # 10<br>(102d-102e) | | | | |
|---|---|---|---|---|
| | 31 | 102e-102d | 96 | — |
| | 8 | 102e-102a | 1 | — |
| | 7 | 102e-102g | 1 | — |
| | 10 | 102i-102a | 1 | — |
| | 0 | 102a-102g | 1 | — |

Resulting spares network from pass one

802

| # | Span | No. Spares |
|---|------|------------|
| 0 | 102a-102b | 10 |
| 1 | 102a-102j | 12 |
| 2 | 102b-102c | 10 |
| 3 | 102b-102j | 3 |
| 4 | 102c-102i | 8 |
| 5 | 102c-102d | 6 |
| 6 | 102i-102h | 8 |
| 7 | 102d-102e | 4 |
| 8 | 102d-102h | 104 |
| 9 | 102e-102f | 12 |
| 10 | 102e-102h | 99 |
| 11 | 102f-102g | 7 |
| 12 | 102j-102f | 4 |
| 13 | 102j-102g | 9 |

Resulting spares network from pass two

804

| # | Span | No. Spares |
|---|------|------------|
| 0 | 102a-102b | 9 |
| 1 | 102a-102j | 14 |
| 2 | 102b-102c | 8 |
| 3 | 102b-102j | 1 |
| 4 | 102c-102i | 8 |
| 5 | 102c-102d | 4 |
| 6 | 102i-102h | 5 |
| 7 | 102d-102e | 6 |
| 8 | 102d-102h | 98 |
| 9 | 102e-102f | 11 |
| 10 | 102e-102h | 99 |
| 11 | 102f-102g | 12 |
| 12 | 102j-102f | 6 |
| 13 | 102j-102g | 2 |

FIG. 8A

806 — Inititial spares network to be used for pass three

| # | Span | No. Spares |
|---|---|---|
| 0 | 102a-102b | 9 |
| 1 | 102a-102j | 12 |
| 2 | 102b-102c | 8 |
| 3 | 102b-102j | 1 |
| 4 | 102c-102i | 8 |
| 5 | 102c-102d | 4 |
| 6 | 102i-102h | 5 |
| 7 | 102d-102e | 4 |
| 8 | 102d-102h | 98 |
| 9 | 102e-102f | 11 |
| 10 | 102e-102h | 99 |
| 11 | 102f-102g | 7 |
| 12 | 102j-102f | 4 |
| 13 | 102j-102g | 2 |

FIG. 8B

SPARE CAPACITY ALLOCATION TOOL

BACKGROUND OF THE INVENTION

1. Field of the Invention

The present invention relates to telecommunications and more specifically to a method and apparatus used for determining an efficient and economical spares network for a given telecommunications network.

2. Related Art

A communications network is comprised of a plurality of nodes. Nodes are interconnected with each other by transmission carrying elements known as spans. A plurality of spans is typically connected to each node. Each node is capable of internally cross-connecting any two of the plurality of connected spans with each other. Spans and nodes collectively form the intricate patterns that define the complex mesh of a typical communications network.

Spans carry communications traffic between nodes. Each span comprises a multitude of individual communication channels therein. For example, a SONET OC-12 optical fiber transmission cable comprises the transmission equivalent capacity of 8,064 standard voice channels. Generally, a certain portion of the total capacity of a span is used as traffic bearing channels and a certain capacity is reserved as spare channels. The spare capacity is used to restore communications in the event of a breakdown.

Spans are subject to breakdowns for one reason or another. Often transmission cables, including optical fibers, are buried underground and/or under water. Such cables being vulnerable to human and other environmental hazards may be severed and rendered inoperable. When this occurs, reserved spare capacity within non-severed spans are used to carry the re-routed traffic that was formally carried by the severed span. The combination of the spare capacity and their interconnecting nodes are referred to herein as a spares network. Ideally, a spares network is a subset of an associated traffic bearing network (hereinafter referred to as a 'traffic network' or 'revenue bearing network'). Thus, a typical telecommunications network comprises a spares network and a traffic network.

Nodes may be used to re-route traffic, via cross-connections, in the event of a breakdown. In addition, nodes are used as a point where spans are physically coupled together without using the cross-connecting feature of a node. Connecting spans in this manner is an economical alternative to using the limited and expensive cross-connecting method. Thus, such physical connections are often employed within nodes where more economical and permanent-type connections are desired. Since many of the examples used in the present specification refer to the use of optical fiber cables, such physical connections that bypass the cross-connecting feature of nodes are referred to herein as 'glass-throughs'.

Restoration of traffic is accomplished by disconnecting malfunctioning spans and re-directing traffic into functioning spans that contain redundant or spare capacity. Such connections and disconnections takes place at various cross-connecting nodes within the telecommunications network. The re-routing of traffic via the cross-connecting nodes can be accomplished manually (i.e. by dispatching service crews to manually perform the cross-connections in each node), or automatically (i.e. by remotely controlling the cross-connections in each node).

The spares network remains idle until needed. Typically, when a breakdown occurs within in the traffic bearing network a restoration mechanism is triggered. Generally, the restoration mechanism is coupled with an automated control mechanism. The control mechanism remotely cross-connects the nodes specified by the restoration mechanism to re-route the interrupted traffic around the failed span(s). Portions of the spares network are generally used to carry the re-routed traffic.

In order to be maximize efficiency and minimize cost, it is desirable to have a spares network that is as small as possible but still large enough to support a particular level of restoration. A typical level of restoration is one that is capable of 100% restoration for any single span cut in the traffic network. Since the spares network remains idle until needed, most of the time it is not generating any revenue for a telecommunications company. However, because the spares network must be capable of transporting traffic when needed, it is every bit as costly to deploy and maintain as is the traffic/revenue bearing network. Thus, the motivation to minimize the spares network is clear.

Spare network design is typically performed by experts in the telecommunications field using simulation methods. A communications network is designed and modeled. This model may or may not include an initial spares network. Once a model exists, breakdowns within the communications network are simulated. Demand routes that are affected by such breakdowns are identified and re-routed. A spares network is 'built' as a result of the total required spare transmission lines needed to restore the demands affected by a plurality of such simulated breakdowns. Many variables exist in such simulation techniques that can affect the resulting spares network design, such as the level of restoration desired, the extent of simulated breakdowns, and the assumed initial spare network capacity.

Conventionally, the determination of a minimum spares network is performed manually. This does not preclude the use of one or more automation tools to assist in such manual determination. A typical example of such a tool is a computer program used to calculate the shortest path between two nodes, such as the well known Dijkstra algorithm. For the most part however, the conventional process is a manual one. Trial and error techniques are used to approximate the best solution to the minimum spares network allocation problem. Due to the complex nature of the problem there is no known practical technique available that will generate an optimal solution.

An example of a typical conventional method will now be described. Generally, manual solutions are performed by experts in the telecommunications field. It is not uncommon that such experts rely to some extent, on educated guesses, initial assumptions, trial and error techniques, and even hunches and the like to arrive at final solutions. In the end, it is typical to add additional spare capacity to the final solution so that a sufficient level of restoration is assured.

Typically experts begin their analysis with data pertaining to the topology of a traffic-bearing network. Topology data includes the configuration of the traffic bearing nodes and spans and how they are interconnected. Such data is used in conjunction with demand data. Demand data includes a list of the required capacity between particular pairs of nodes based on current or estimated demand for services. Next, each span in turn is removed from the topology of the network. The removal of each span is used to simulate a severed span.

The demands that are affected by the severed span are then identified. Next, alternate routes are calculated for each interrupted demand flow of traffic and the spare capacity needed within such alternate routes is identified. This is the step where computer programs may be used to help calculate the 'most appropriate' alternate route. This calculation can be based on a number of different criteria, such as the shortest path, re-use of currently available spare capacity, least number of cross-connections and other least cost methods. This is also the step where intuition, hunches and the like, may come into play by the telecommunications expert because there are typically a multitude of alternate paths to choose from for each severed demand flow. Finally, a spares network results which comprises the aggregate of required spare capacity from each simulated span cut.

Unfortunately, unless one is dealing with very small networks, it is virtually impossible to find an optimal solution using manual methods such as the one described above. As the size of the communications network and the level of network meshing increases, so does the complexity of the problem. Thus, suboptimal solutions are generally deployed. Further, as previously discussed, a larger than necessary spares network is generally implemented to be sure that an adequate level of restoration is provided. This leads to a significant waste of time, resources and revenue.

Theoretically, it is possible to generate an optimal solution to the minimum spares network allocation problem with the use of linear programming techniques. It has been noted that computer based models can be used to determine the minimum spare capacity required for an associated level of restoration. Typically, the spare capacity allocation problem is formulated as mathematical constraints (equations) and is solved using well known linear programming methods.

However, there are several problems associated with this theoretical technique. Linear programming techniques require an enormous amount of computer time and processing power. Indeed, using modern computer facilities it is computationally infeasible to perform such techniques for large communication networks. Further, even for small communication networks, these techniques require an exorbitant amount of time to produce an optimal solution.

In addition, in spite of excessive computational time, the solutions rendered by linear programming techniques are often not practical. In many instances non-integer, fractional solutions are generated by such techniques. Thus heuristic techniques are used to convert fractional solutions to integer solutions, which often results in sub-optimal solutions. Thus, even if a computationally expensive linear programming solution is possible, there is no guarantee that an optimal solution is generated.

Further, the linear programming techniques do not take glass-throughs into account. The presence of glass-throughs adds a level of complexity that is currently not addressed by such theoretical methods. Adding another level of complexity to this problem renders the theoretical solutions even more impracticable. The complexity arises in part, due to the fact that without glass-throughs, a single span cut can only affect the two adjacent nodes which are directly coupled with the severed span. However, with the presence of glass-throughs, a plurality of more distant nodes may be affected by a single span cut.

Another reason glass-throughs complicate matters is due to the more permanent nature of the glass-through connection (in contrast with a cross-connection). Thus, conventional methods which do not account for glass-throughs may assume that a cross-connection may be performed during a restoral procedure, when in fact such cross-connection cannot be performed. Additionally, due to the increased level of complexity to an already difficult problem, glass-throughs are typically not taken into account using manual conventional methods as described above.

Another conventional method used to determine spare capacity is known as the simulated annealing technique. This technique yields global solutions based on the iterative repetition of many simple local computations. The simulated annealing technique can supply near-optimal solutions for certain types of networks. For a complete description of this technique, see Brian A. Coan, et. al, *Using Distributed Topology Update and Preplanned Configurations to Achieve Trunk Network Survivability*, IEEE Transactions on Reliability, Col. 40, No. 4, 1991 Oct.

The problems with using the simulated annealing technique is that is requires enormous computational resources. Although this technique may use less computational resources than the linear programming technique described above, the computational resources required are nonetheless significant. For example, a near-optimal solution using the simulated annealing technique for a typical communications network may take on the order of 24 hours to complete. Thus, it is impracticable to use this technique when quick turn-around solutions are required, such as in the case for interactive network design and the like.

SUMMARY OF THE INVENTION

The present invention discloses a method and apparatus for determining an efficient and economical spares network. This method uses far less computational resources than conventional methods. An economic solution is generated that is very close to the optimal solution but is generated much faster than conventional methods. For example, the present invention generates an economical solution to a typical communications network in a matter of seconds. This is to be contrasted with the computational time required to generate a near-optimal solution using the simulated annealing technique, which is generally measured in hours.

The present invention enables telecommunication companies to quickly find an economic solution to the spares network allocation problem. Additionally, a wide range of network configurations can be modeled and experimented with in order to determine the best combination of traffic and spares networks for planning purposes, interactive design purposes, and the like. Solutions can be obtained for very large and complex communications networks comprising a multiplicity of nodes with a high degree of meshing. Additionally, the present invention takes glass-throughs into account thereby rendering more efficient and accurate solutions than conventional methods which do not account for the presence of glass-throughs.

The present invention provides a design for a spares network according to a specified level of restoration. A typical desired level of restoration is one that is capable of 100% restoration for any single span cut in the given traffic network. The communications network is modeled by reading in several input text files comprising a description of the current traffic-network and the current spares network (if any). The description files include network configuration information as well as information pertaining to the traffic demands of the network.

For the typical level of restoration described above, a cut is simulated for each span within the traffic network. For a particular cut, each affected demand flow is identified and processed by rerouting the demand so as to avoid the simulated cut. A rerouting solution is generated for each component of demand flow and spares are "purchased" as needed. The new spares that are purchased are reused during subsequent demand processing.

The present invention builds a spares network based on a minimum incremental cost basis. Thus, pre-purchased spare capacity is used before new ones are purchased, even if such re-use requires longer restoration paths. Rather than building nearby spares for every possible cut site, the present invention spreads the restoration away from the cut site in order to efficiently use and re-use every spare purchased. Additional spares are purchased only where exiting spares are insufficient to restore network demand traffic terminated by the severed span. The present invention employs a three pass method, where each pass derives a spares network. The third pass is initialized with a spares network comprising the common results from the first two passes, thereby generating an efficient final result.

Features and Advantages

Accordingly, a feature of the present invention is that it provides a design for an efficient and economical minimal spares network.

Another feature of the present invention is that it provides a solution to the minimum spares network allocation problem for large complex communication networks.

Still another feature of the present invention is that it provides a solution to the minimum spares network allocation problem which takes glass-throughs into account.

An advantage of the present invention is that it provides a solution to the minimum spares network allocation problem much faster than conventional methods, so that such solutions can be used in interactive network designs for planning purposes and the like.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein:

FIGS. 3A and 3B depict the contents of the input files which may be used in a preferred embodiment of the present invention;

FIGS. 4A, 4B and 4C depict the contents of the output files which may be used in a preferred embodiment of the present invention;

FIG. 7 depicts a set of cutsite lists used to describe a preferred embodiment of the present invention;

FIG. 8A and 8B depict an example of resulting spares networks from the first two passes and a derived initial spares network for the third pass of a process that can be used to implement a preferred embodiment of the present invention;

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
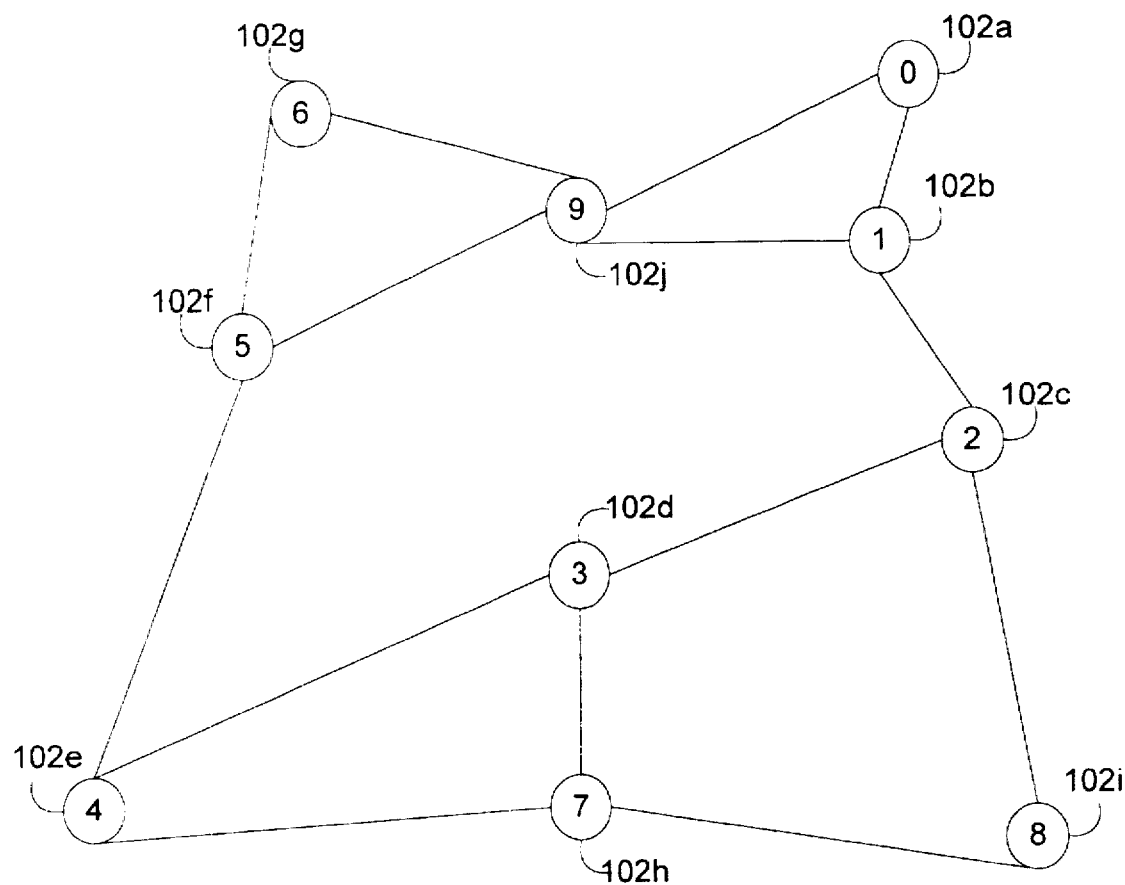
FIGS. 1 and 11 is a block diagram depicting a simplified view of a communications network.

FIG. 1 depicts a simplified view of a communications network. The communications network comprises a plurality of nodes, $102a$–$102j$ (generally 102), and a plurality of spans interconnecting the nodes 102. Each span will be referenced herein according to its two adjacent nodes. For example the span disposed between the nodes $102h$ and $102i$ will be referred to as the span $102h$–$102i$. Note that each span is capable of transporting communications traffic in either direction. Generally, once a communication channel has been established, traffic therein flows in both directions simultaneously.

Figure 2:
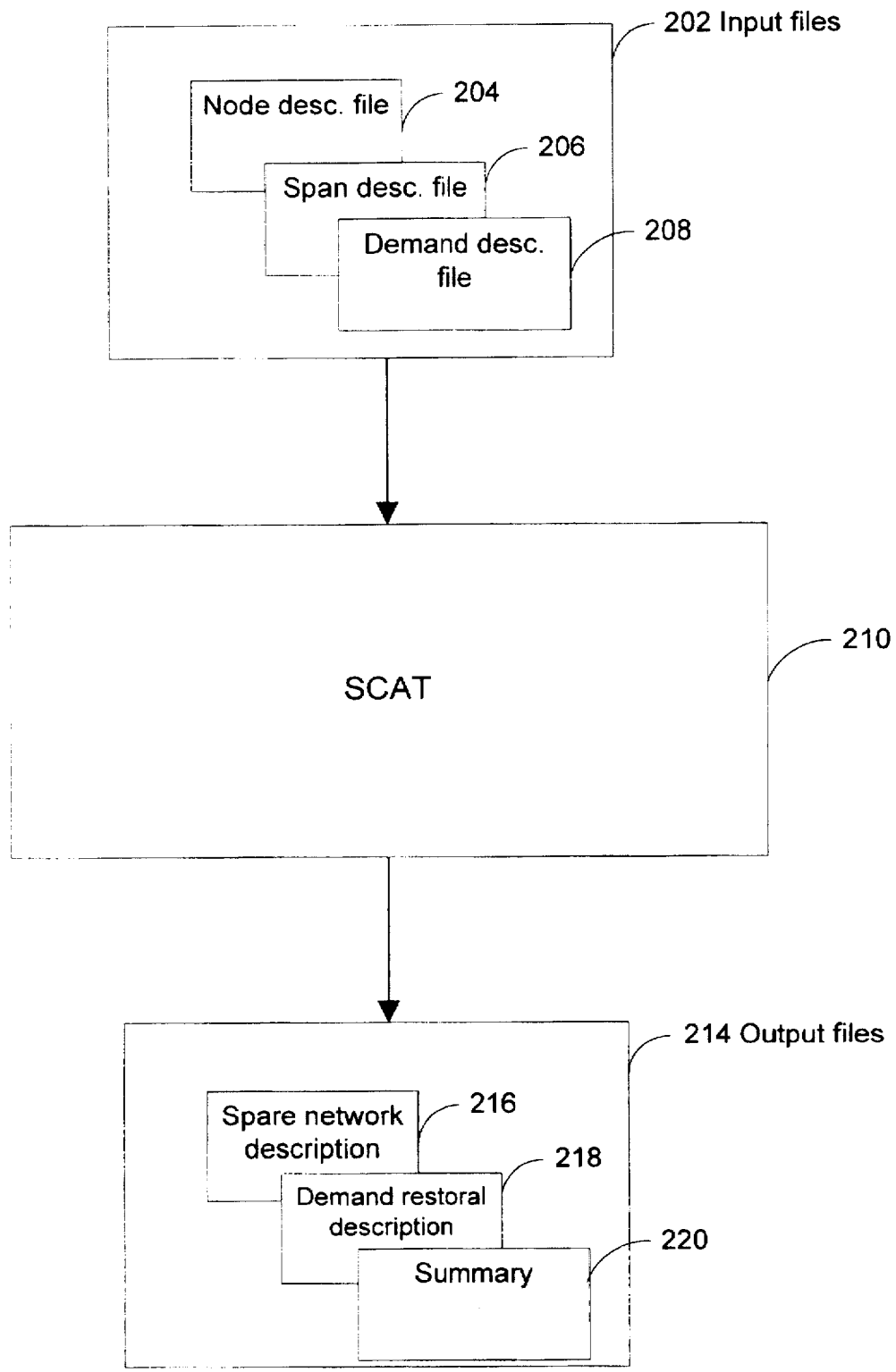
FIG. 2 is a block diagram depicting a preferred embodiment of the present invention in terms of it inputs and outputs.

Referring now to FIG. 2, one implementation of the present invention is depicted in terms of its input and outputs. The spare capacity allocation tool (SCAT) 210 accepts as input the network description files 202. Input files 202 comprise a node description file 204, a span description file 206 and a demand description file 208. The output of SCAT 210 are the output files 214. The output files 214 comprise a spares network description file 216, a demand restoral description 218 and a summary 220. Examples of the contents comprising each of the three input files 202 and the three output files 214 will be described with below reference to FIGS. 3A, 3B and 4 respectively.

The communications network 100 depicted in FIG. 1 is used in the examples below to describe an embodiment of the present invention. The modeling of the communications network 100 is accomplished with the use of the three input files 204, 206 and 208, as shown in FIG. 2. These input files 202 describe the network 100 in terms of nodes, interconnecting spans and traffic demands.

The input files 202 comprise a node data file 304, a span data file 306 and a demand data file 308. Each input file 202 describes a different aspect of the communications network 100. Each input file contains a plurality of individual entries. Each individual entry is referred to herein as entry # n, where n is the number located in the first position within each row in each file (under the '#' heading ). For example, entry #4 in the node data file 304 contains the value '$102e$'.

The node data file 304 contains a list of all of the nodes that comprise the communications network 100. In this case, nodes $102a$, $102b$, . . . and $102j$ are listed in the node data entries #0 ,# 1, . . . and #9 respectively. Note that the '#' entry also corresponds with the number inside the circle representing each node in FIG. 1. For example, the circle representing node $102a$ in FIG. 1 includes a '0', therein, which corresponds with the entry #0 in the node data file 304. In this fashion, the node data file 304 contains a complete list of the nodes within the communications network 100.

The interconnection between the nodes 102 are described in the span data file 306. As can be seen by the heading in the first row of the span data file 306, each entry (#n), contains the designation of a span and its associated length in miles. For example, entry #0 comprises a span connected between nodes $102g$ and $102h$ (referred to as span '$102g$–$102j$'). Further, span $102g$–$102h$ is 46 miles long, as can be seen under the 'Length' heading. Similarly, span $102a$–$102j$ is 109 miles long. Each of the 14 spans depicted in the network 100 has an associated entry in the span data file 306.

The demand file 308, as shown in FIG. 4B, comprises information relating to the demand of traffic within the network 100. Demand data includes the requirements in terms of required capacity between a particular source node and a particular destination node. The source and destination nodes are labeled as 'Src/Dst'. Typically the capacity (labeled 'Dmd'), is represented in terms of the number of physical transmission lines that are required for the particular demand. In this example the demand capacity is represented in terms of the number of DS-3 transmission lines. One DS-3 has the capacity to carry 28 T1 transmission channels, where each T1 has the capacity to carry about 24 voice channels. Thus, one DS-3 carries the equivalent of 672 voice channels.

Note that a typical span in a fiber optical communications network comprises a SONET OC-48 optical fiber transmission cable. An OC-48 comprises the equivalent capacity of 48 DS-3s or 32,256 standard voice channels. Typically each node is capable of selectively cross-connecting transmission lines at the DS-3 level. Thus, demands are typically represented in terms of the number of required DS-3 transmission lines.

The examples used herein represent a simplified view of a telecommunications network in terms of its size, complexity and level of demands. However, this simplified view is used throughout in order to clearly and distinctly point out the principles of the present invention, which can be applied to any communications network with any level of complexity. Further, the present invention can be used to provide a design for an economical spares networks for other types of environments. For example, the present invention can be used for computer networks such as local area networks (LANs), wide area networks (WANs), and the like.

Referring back now to the demand data file 308 in FIG. 3B, each entry specifies a demand in terms of a source and destination node. As can be seen by entry #0, the source and destination nodes are 102a and 102g respectively. The demand for traffic between the nodes 102a and 102g requires the use of 1 DS-3 transmission line (as can be seen under the 'Dmd' heading). In other words, based on current information, estimates, statistical data or the like, one DS-3 line, (or 672 voice channels) are required to handle the traffic demand between the nodes 102a and 102g. Typically, such demand is expressed in terms of nodes between particular cities or other geographical designations. For example, a certain number of DS-3 channels are required to handle the expected traffic between a particular node in New York and a particular node in Los Angeles. The traffic between the cities or between any two nodes travels in both directions and can originate from either node. Thus the source and destination designations of the demand nodes are used herein only for convenience only, and such designations can be used interchangeably.

The third column in the demand data file 308 contains optional routing information. For example, again using entry #0, the demand from 102a to 102g is routed via the following nodes: 102a–102b–102c–102d–102e–102f–102g. As stated the specific routing information is optional. If such routing information is not included in a particular demand entry in demand data file 308, a standard and well known computer algorithm, such as the well known Dijkstra algorithm is used to determine the shortest, or otherwise most efficient path between the source and destination nodes. Additionally, the nodes between the source and destination nodes are treated as glass-throughs if no alternative routing information is supplied.

Additional information may also be included in the demand data file 308 pertaining to presence of glass-throughs (in contrast to the presence of cross-connections) within a particular demand path. A '*' listed at the end of a node identifier in the demand data file 308 (such as '102a*' in entry #0), indicates that such node is connected via a cross-connection. The absence of a '*' indicates that the routing is accomplished (or assumed to be accomplished) via a glass-through. In this example, note that all intermediate nodes (that is, the nodes between the source and destination nodes), are treated as glass-throughs.

Note that each node that is designated as a source and destination node in a particular route, includes a '*' which indicates that such route is terminated (or originated) via a cross-connection within that node. This is so because by definition, origination and termination nodes must be connected via cross-connections in order to enter and leave the communications network 100.

The output files 214 will now be described with reference to FIG. 4A, 4B, and 4C. As stated, the output files 214 in this example embodiment of the present invention includes a spares network data file 416, a demand restoral data file 418 and a summary data file 420. The primary output file is the spares network data file 416 which describes the resulting spares network. The resulting spares network is defined in terms of the spare capacity required for each span in the network 100.

For example, referring to entry #0, span 102a–102b requires 7 spares. Once again in this example, capacity is expressed in terms of the number of DS-3 transmission lines required. Thus, in this case, 7 DS-3s should be reserved as spares in the span 102a–102b. Similarly, 9 DS-3s should be reserved as spare capacity in the span 102a–102j, as can be seen by entry #1. In this fashion a particular spare capacity (if required), is specified for each of the spans (entries #0–#13) in the network 100. Note that the spares network data file 416 comprises complete description of the resulting spares network. The other two files are not essential, but provide additional information pertaining to the resulting spares network.

Additional information is provided by the demand restoral data file 418 as shown in FIG. 4B. As stated, and as will be subsequently described in more detail herein, the present invention simulates a cut in each span within the network 100. The location in which a span cut is simulated is referred to herein as a 'cutsite', which can be anywhere along a particular span. In the demand restoral data file 418, each cutsite entry (see the first column), is listed in the order in which the present invention sorts the list of cutsites for processing purposes. Thus, each cutsite is referred to herein as 'cutsite(n)', where n is equal to the order in which the present invention sorts the cutsites. For example, cutsite (0) indicates the first cutsite in the sorted list and cutsite (13) indicates the last cutsite listed in the sorted list. A more detailed description of the sorting of the cutsites and its relevance will become clear as the instant disclosure progresses.

The demand restoral data file 418 lists the affected demands and the calculated restoral path for each affected demand. Each cutsite has the potential to affect zero, one or a more demands. The demand restoral data file 418 comprises n entries 402a, 402b, . . . , 402n (generally, 402). Each entry 402 represents the results from a single cutsite simulation. As stated, each entry comprises a list of the effected demands associated with the cutsite and final calculated resulting restoral path.

For example, the first entry 402a in the demand restoral data file 418 depicts the results from the processing of cutsite (0), which in this case, represents a simulated cut of the span 102d–102h. The results of the cutsite (0) are shown in the second column of entry 402, in terms of the 'Affected Demand', the calculated 'Restoral Path', and the 'No. of DS-3s' required to restore the affected demand traffic. The span '#' shown in the first column corresponds to the associated entry # in the span data file 306. Similarly, the number shown in the first position under the 'Affected Demand' column, corresponds with the associated entry # in the demand data file 308.

Thus, as can be seen by entry 402a, when span 102d–102h is severed, two demand routes are affected. The first affected demand is the demand entry 15 (from 102i–102d). As can be seen by entry #15 in the demand data file 208, the original routing path for this demand was 102i–102h–102d. Therefore, a break in the span 102h–102d clearly affects this demand traffic. Next, the demand restoral path is listed in the demand restoral data file 418. In this case, the restoral path provided by the present invention is the path 102i–102c–102, as can be seen under the heading 'Restoral Path' in entry 402. Thus, as can best be seen by examining FIG. 1, the severed span (102d–102h) is avoided and the demand traffic from 102i–102d, is effectively re-routed around the severed span.

The next entry demand that is affected by the cutsite (0) in entry 402a is the demand 102e–102d. As can be seen by entry #11 in the demand data file 308, the original routing path for this demand was 102e–102h–102d. Therefore, a break in the span 102h–102d affects this demand as well. Next, the demand restoral path is depicted in the demand restoral data file 418. The restoral path calculated by an embodiment of the present invention in this case is 102e–102d. Thus, as can be seen by examining the topology of the network 100 as depicted in FIG. 1, the severed span (102d–102h) is avoided and the demand traffic (from 102e–102d), is again effectively re-routed around the severed span.

In a similar fashion, each of the cutsites, from cutsite (0) to cutsite (13) is listed in the demand restoral data file 418. Each of the demands (from the demand data file 308), that is affected by each of the span cuts is listed, along with the calculated restoral path and the required restoral capacity. For example, as can be seen by the next entry 402b, 5 demands are affected by cutsite (1) (span 102c 102i), namely demand #s 26,28,9,29 and 24 (as listed in the demand data file 308). The resulting restoration paths and required restoration capacity is listed for each of the 5 affected demands for the cutsite (1) 402b.

Likewise, as can be seen by the last entry 404n, 5 demands are also affected by the cutsite (13) (span 102c–102i). The demands that are affected are demand #s 31,8,7,10, and 0 (as listed in the demand data file 308). The resulting restoration paths and required restoration capacity is listed for each of the 5 affected demands for cutsite (13) 402n.

Thus, the present invention provides a complete report of the results from each cutsite in terms of the affected demands, the restoration paths used to calculate the spares network, and the required spare capacity for each demand restoration. Note that it is not a function of the present invention to perform restoration of interrupted traffic. However, the present invention can provide restoral path information to such a device, if desired.

The final output file depicted in FIG. 4C is a summary data file 420 which, among other things, depicts the efficiency of the spares network as provided by an implementation of the present invention. In this example, each span in the network 100 is listed as a separate entry in the summary data file 420. Listed with each span is the total number of DS-3s that are reserved within each span for the revenue/demand network as well as the total number of DS-3s that are reserved within each span for the spares network. Because the present invention builds its spares network on a minimum incremental cost basis measured in capacity (i.e. DS-3) miles, the total number of DS-3 miles reserved within each span for the revenue/demand traffic and the total number of DS-3 miles reserved within each span for the spare capacity is also included in the summary data file 420. Finally, the summary data 404 displays the total number of DS-3 miles for the revenue network, the total number of DS-3 miles for the spares network, and the ratio of the spares/revenue networks, in terms of total DS-3 miles.

For example, as can be seen by entry #0, for the span 102g–102j, the revenue capacity reserved for this span comprises 7 DS-3s (for a total of 322 DS-3 miles) and the spares capacity reserved for this span comprises 8 DS-3s (for a total of 368 miles). As can be seen, a summary on a span by span basis is listed for each span in the network 100. Finally, as can be seen by the totals calculation 404, the total revenue/traffic bearing network comprises 16,356 DS-3 miles and the total spares network comprises 14,992 DS-3 miles. The ratio of total DS-3 mile spares to total DS-3 miles revenue networks is 90.7%. In other words, for every 100 miles of revenue DS-3s, there are 90.7 miles of spare DS-3s. As stated, it is desirable to have as low a ratio as possible.

A process 500 which can be used to determine a spares network according to a preferred embodiment of the present invention will now be described with reference to the process flowcharts in FIGS. 5A and 5B. In addition, a computer program listing comprising the process 500 in greater detail is presented below in Appendix A. The computer program listing in Appendix A is presented in the form of machine independent pseudo code. The pseudo code can easily be transformed into a variety of computer languages by persons skilled in the relevant art(s) to implement a preferred embodiment of the present invention.

Figure 5A:
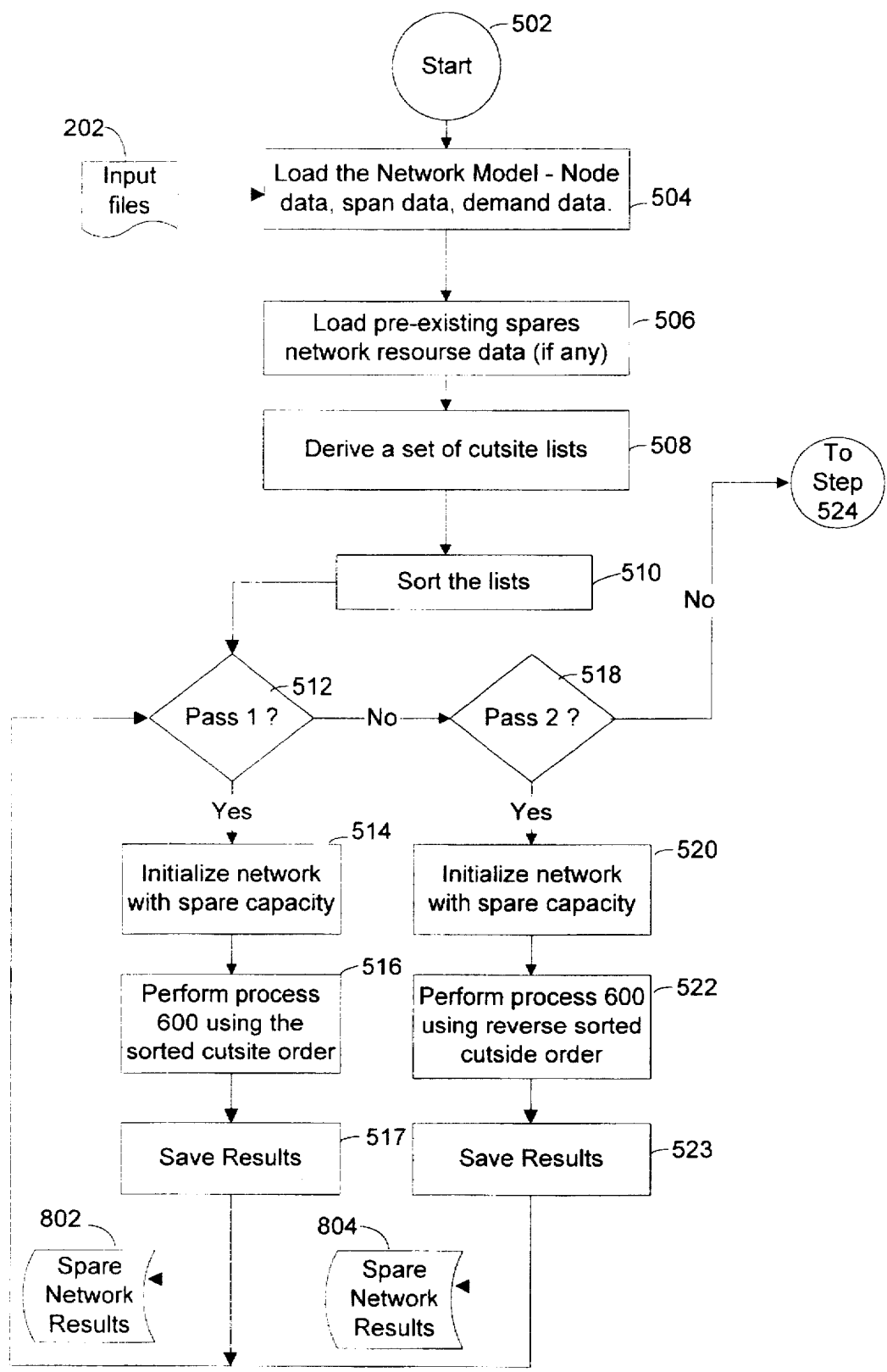
FIGS. 5A, 5B, 6 and 9, are flowcharts depicting a process that can be used to implement a preferred embodiment of the present invention.

Referring to FIG. 5A, the process 500 begins with step 502, where control immediately passes to step 504. In step 504, the input files, comprising a model of the network is read. As previously described, in a preferred embodiment of the present invention, the input files 202 comprise a node data file 304, a span data file 306 and a demand data file 308. Note that many other means and methods may be used to model the communications network in step 504 without departing from the principles of the present invention.

Next, in step 506, pre-existing spare capacity (if any) is added to the network model from step 504. Pre-existing spare capacity generally represents already existing capacity within particular spans that have been allocated as spares. In a typical implementation, where the present invention is used to design a new spares network, this set is typically empty. However, this feature provides a means to take into account already existing spares so that such spares can be used as a base or starting point for a spares network. This is useful in cases of iterative or phased-in network designs, interactive designs, design changes and the like.

Next in step 508 a set of cutsite lists is derived. Each cutsite list comprises a list of all the demand traffic affected by the severed cutsite. An example of a set of cutsite lists is depicted in FIG. 7. In FIG. 7 a set of 'n' cutsite lists 704a, 704b, .... 704n (generally 704) is depicted. Each cutsite list comprises a list of the demands affected by the severed cutsite. For example, as can be seen by the cutsite list 704a, the affected demands for the cutsite represented by the span 102d–102h are the demand flow 102i–102d, which comprises a demand capacity of 2 DS-3s, and the demand flow 102e–102d, which comprises a demand capacity of 2 DS-3s. Thus the total demand flow severed by the cutsite (0) 704a comprises a total capacity of 4 DS-3s (total capacity not explicitly shown).

In addition, each cutsite list contains a list of spare network capacity (if any) that would be affected by each severed cutsite. In other words, if spare capacity exists within the span represented by the cutsite, the cutsite list includes this information so the process 500 does not attempt to re-use the severed spare capacity in its restoral calculations. In this example, no initial pre-existing spares network exists, thus, a '-' is depicted under the heading 'Affected Restoration Resource'. Note that as spares are added to the spares network during the processing of the process 500, these fields will contain those added spares within the span that would be affected by the severed cutsite.

Next in step 510, the set of cutsite lists derived in step 508 are sorted according the following hierarchy: (1) ascending order of total demand flow severed, 'adjacent and extended'; (2) ascending order of total adjacent demand flow severed; (3) ascending order of total extended demand flow severed; and (4) descending order of interconnect cost or distance. The meanings of 'adjacent' and 'extended' demand flows are described below. In addition, examples and details of this sorting function are presented below. Note that the set of cutsite lists 702, not the contents of each cutsite list 704 is sorted in step 5 10. Thus, the cutsite lists 704a, 704b, . . . , 704n are sorted according to the preceding criteria.

To illustrate the sorting function, assume that the set of cutsite lists 702 has been sorted in step 510 according to the preceding criteria. Accordingly, the cutsite list 704a is referenced in FIG. 7 as 'cutsite (0)' because its position is at the top of the sorted list. Similarly, the cutsite list 704n is referenced as 'cutsite (13)' because its position is at the bottom of the sorted set of cutsite lists 702.

In the description below, the processing of the set of cutsite lists 702 is described as being processed using the 'sorted cutsite order', or using the 'reverse cutsite order'. Processing the set of cutsite lists 702 using the sorted cutsite order refers to processing of the cutsite list from the top of the list to the bottom, (i.e. a processing sequence of 702a, 702b, . . . , and 702n). Likewise, processing the set of cutsite lists using the reverse sorted cutsite order refers to processing the list from the bottom to the top, (i.e. a processing sequence of 702n, . . ., 702b, and 702a).

As stated, the set of cutsite lists derived in step 508 is sorted according the following hierarchy: (1) ascending order of total demand flow severed, adjacent and extended demand flows; (2) ascending order of total adjacent demand flow severed; (3) ascending order of total extended demand flow severed; and (4) descending order of interconnect cost or distance. An adjacent demand flow refers to a demand flow that is connected via cross-connections to both adjacent nodes. In other words, adjacent demand flow refers to those demands in which re-routing is possible by controlling the cross-connections within either of the two adjacent nodes.

For example, referring now to FIG. 1, suppose the process 500 is processing a cutsite represented by the span 102g–102j. Further suppose one of the severed demand flows is the demand **102b*–102j*–102g***. Recall that the '*' refers to a cross-connection. Note that the interrupted demand flow is connected to the node 102j via a cross-connection. Further note that the demand flow can be re-routed by changing the cross-connection from either one of the cutsite's adjacent nodes (node 102j or node 102g). Thus, because it is possible to redirect the demand flow via either adjacent node, this demand flow is referred to herein as an adjacent demand flow.

The definitions of extended and adjacent demand flows will now be described. An extended demand flow refers to a demand flow that bypasses, via glass-throughs or the like, at least one of the cutsite's adjacent nodes. For example, again referring to FIG. 1, suppose the process 500 is processing a cutsite represented by the span 102g–102j. Further suppose one of the severed demand flows is the demand **102b*–102j–102g*. This time, notice that the interrupted demand flow is not connected to one of the adjacent nodes, namely node 102j, via a cross-connection. Instead node 102j is bypassed via a glass-through. Thus, it is not possible to reroute this severed demand traffic by a new cross-connection in the node 102j**. Consequently, the restoration procedure may have to move further away from the cutsite in order to begin a restoration process. Because it is not possible to redirect the severed demand flow via one of the adjacent nodes, this demand flow is referred to herein as an extended demand flow.

Thus, the set of cutsite lists 702 is sorted as follows. First, the total severed demand flow for each cutsite list is calculated. For example, as can be by FIG. 7, the total severed demand flow for the cutsite list 704a is 4 DS-3s. This is calculated by adding up the demand flow capacity from the middle column, (under the heading 'No. DS-3s'), for each affected demand flow in the cutsite list 704. Likewise, the total severed demand flow for the cutsite list 704b is 8 DS-3s. Finally, the total severed demand flow for the cutsite list 704n is 100 DS-3s. Thus, the entire list is sorted in this fashion.

The second sort criterion, namely ascending order of total adjacent demand flow severed is performed on sub-lists (not shown) that comprise equal total severed demand flows. For example, suppose in addition to the cutsite list 704b, 3 other cutsite lists comprise the same total severed demand flow of 10 DS-3s. In this case, those 4 cutsite lists having equal demand flows are resorted among themselves using the second sort criterion.

The third sort criterion, namely ascending order of total extended demand flow severed, is performed on the sub-lists (not shown) having equal values for both the total demand flow severed and the total adjacent demand flow severed. Finally the forth sort criterion, namely descending order of total span distance is used to sort the sub-lists having equal values for all three prior sort criteria. The information provided to an implementation of the present invention, as previously described, is sufficient for the process 500 to sort the set of cutsite lists 702 according the preceding criteria. As stated the three input files 202 include all of the information pertaining to the network 100 that is needed. For example, the span data file 306 includes the length in miles of each span which is used to sort the lists according to the span distance. Thus, specific methods which can be used to sort the lists as described above will be apparent to those persons skilled in the relevant art(s).

After the set of cutsites is sorted in step 510, control passes to step 512. Before describing the details of the rest of the process 500, an overview is presented below. The process 500 next performs a similar process (process 600, described below) three times. Thus process 500 includes a three pass subprocess. The first pass is referred to as 'pass 1', the second pass is referred to as 'pass 2' and the third pass is referred to as 'pass 3'. The processing steps from each pass are depicted in the flowcharts in FIGS. 5A and 5B below the yes arrows originating from each decision step 'Pass 1?' 512, 'Pass 2?' 518 and 'Pass 3?' 524, which merely pass control to the proper steps required for each pass. For each pass, the same process 600 (described below) is performed. However, for each pass there are differences in the order of cutsite processing and/or the initialization of the pre-existing spares network, as will be described below.

The first pass begins with step 514. In step 514, the network is initialized with the spare capacity as specified in step 506 (if any). As stated, this set of spares is typically empty but can represent a pre-existing spares network. The process then continues with step 516. In step 516 the process 600 (described below) is performed in the sorted cutsite order. This generates a resulting spares network 802. Next control passes to step 517. In step 517 the resulting spares network 802 is saved in storage for use in pass 3 (described below).

The second pass begins with step 520. In step 520 the network is again initialized with the spare capacity as specified by step 506 (if any). The process continues with step 522. In step 522 process 600 is performed but this time the cutsites are processed in the reverse sorted cutsite order. This generates a second resulting spares network 804 which is also saved to storage in step 523 for use with pass 3.

Figure 5B:
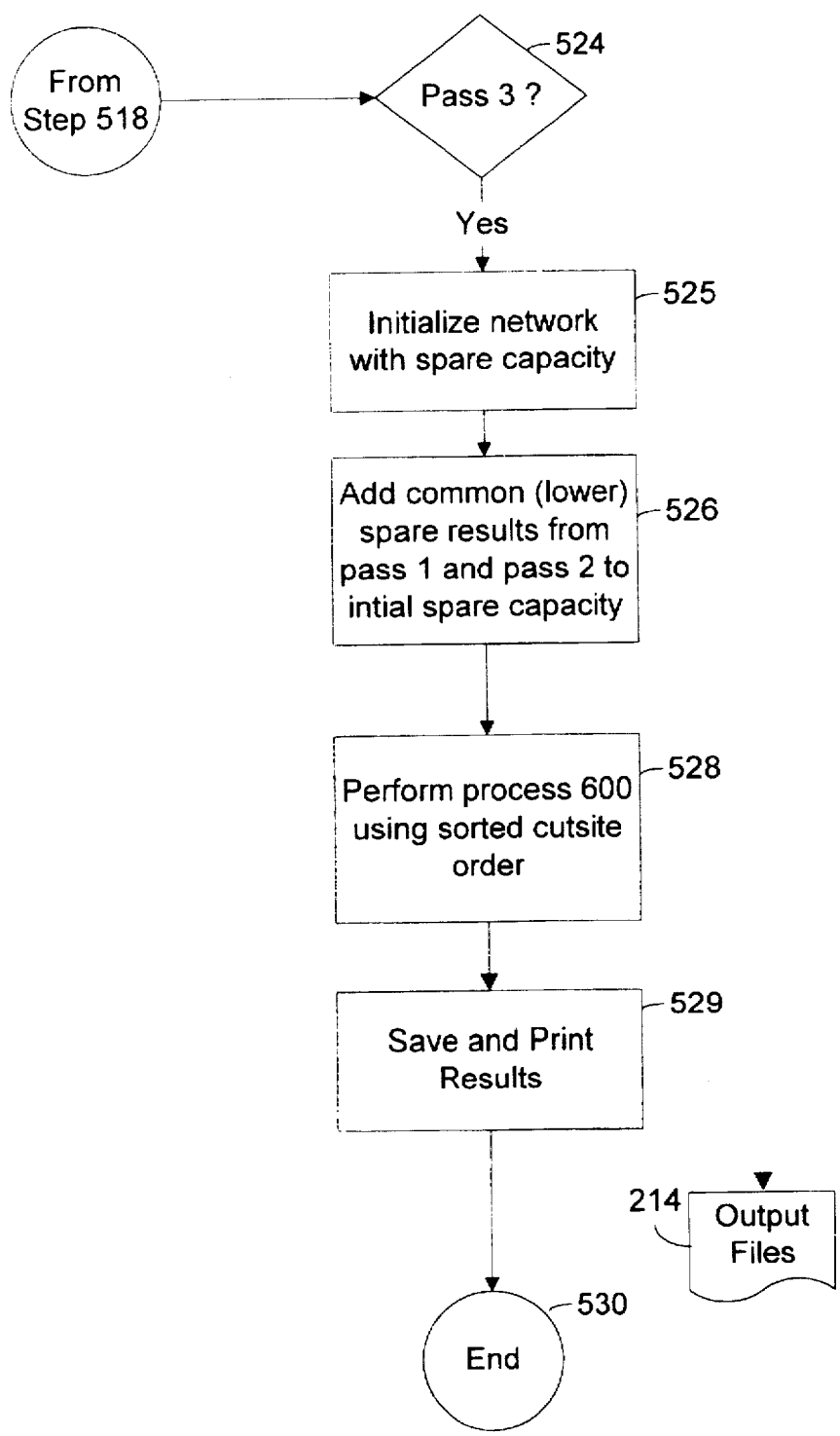

The third pass begins with step 525, as shown in FIG. 5B. In step 525 the network is again initialized with the spare capacity (if any) as specified by step 506. Next control passes to step 526. In step 526 additional components are added to the initial spare network capacity (if any) as from step 525. The additional components of initial spare capacity are derived from the resulting spares networks 802 and 804 from pass 1 and pass 2 respectively. The method used to derive such initial spares network for use with pass 3 is described below with reference to FIGS. 8A and 8B.

In FIG. 8A, the spares networks 802 and 804, resulting from the processing from passes 1 (steps 514–517) and 2 (steps 520–523) respectively, are depicted. In addition, the initial spares network 806 derived in step 526 is depicted in FIG. 8B. The initial spares network 806 is derived by using common results from both passes. Each of the tables 802, 804, and 806 depicted in FIG. 8A and 8B comprise the same type of information as the resulting spares network data file 416, as previously described. Each spares network table 802, 804 and 806 describes a spares network in terms of the spare capacity required for each span in the network 100. Note that it is also possible to have zero spare capacity required for a particular span in the network 100. However, in the examples depicted herein, each span in the network has an associated level of spare capacity.

The following example is used to describe the method for deriving the initial spares network 806 to be used for pass 3. Referring to entry #0 in the table 802, span 102a–102b requires 10 spares, as reported by pass 1. In this example, capacity is expressed in terms of number of DS-3s. Thus, in this case, 10 DS-3s should be reserved as spares in the span 102a–102b, according to the results from pass 1. Similarly, referring now to entry #0 in the table 804, the same span 102a–102b is reported as requiring only 9 DS-3 transmission lines. Thus, the results from both passes agree that at least 9 DS-3s (the lesser of the two values) are required for the span 102a–102b. Consequently, a value of 9 appears in entry #0 within the table 806. This number is used as the initial capacity of available spares within the span 102a–102b for the processing of pass 3. Note that the additional spare capacity, if any, from step 525, is included in the tables 802 and 904 in the 'No. spares' column. The remaining 12 entries in the initial spares network table 806 is completed in a similar fashion until all spans within the network 100 have been addressed.

Referring back to FIG. 5B, the process 500 continues with step 528. In step 528 the process 600 (described below) is performed in the sorted cutsite order. This generates a final design of a spares network. The output files 214 are saved and generally printed, as step 529 indicates. Finally as step 530 indicates, the process 500 is complete.

Figure 6:
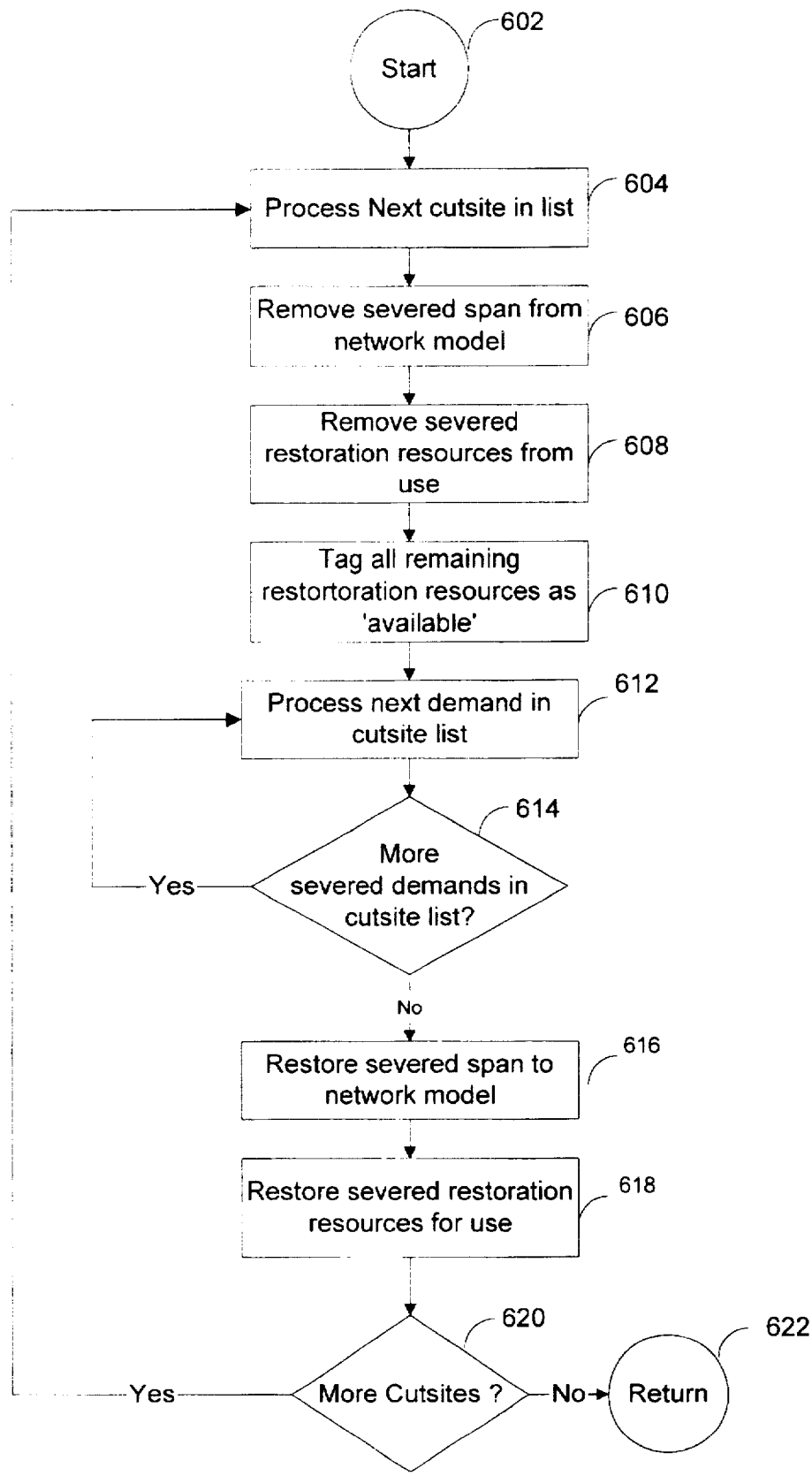

Referring now to FIG. 6, the process 600 which derives a spares network is depicted. The process 600 begins with step 602, where control immediately passes to step 604. In step 604 the next cutsite in the set of cutsite lists 702 is processed. As previously stated, the set of cutsite lists 702 has been sorted. The order in which the set of cutsite lists is processed, depends upon which pass in the process 500 is currently being processed. If pass one or pass three is being processed the set of cutsite lists 702 is processed in the forward sorted order. If pass 2 is being processed, the set of cutsite lists 702 is processed in the reverse order. Thus, step 604 keeps track of the identity and the order in which the set of cutsite lists is to be processed by the succeeding steps.

Next in step 606 the span which represents the current cutsite being processed is removed from the network model, thus simulating a severed span. Control then passes to step 608 where the spare resources (if any) within the severed span are also removed from the network model so that the path restoration process does not use such severed spans.

Next in step 610, all of the remaining spare resources are tagged as 'available', so that such resources may be used when restoring the interrupted demand traffic. Control then passes to step 612 where the next demand comprising the current cutsite list 704 is processed. The processing represented by step 612 is depicted in FIG. 9.

Figure 9:
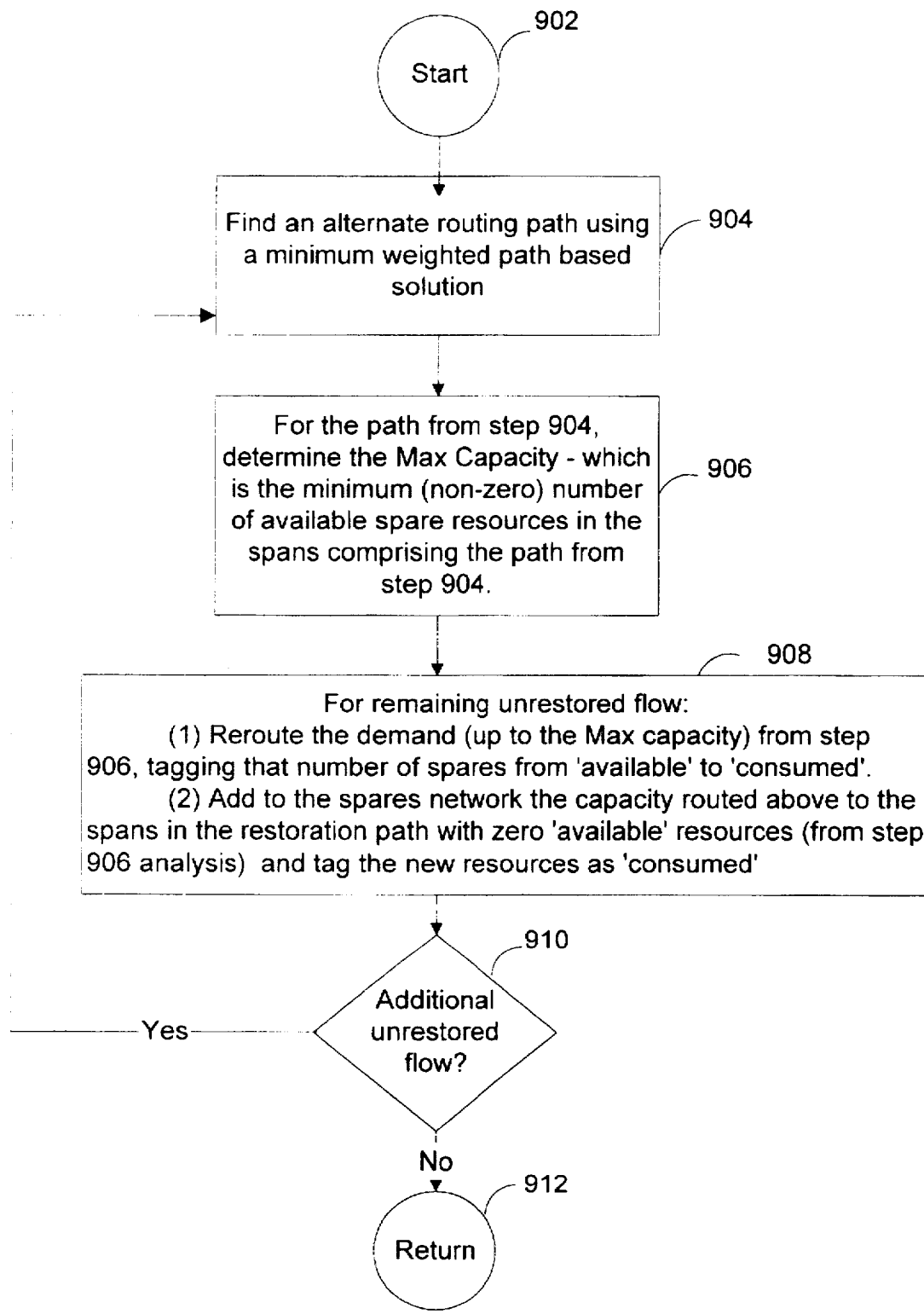

Referring now to FIG. 9, process 612 begins with step 902 where control immediately passes to step 904. In step 904 a minimum weighted path solution is derived. This represents an alternate path for the demand traffic that is severed at the current cutsite. Many methods are available to determine this alternate route, which can be based on a number of criteria. Finding a minimum weighted solution involves using methods that take into account certain pre-determined desired and undesired characteristics. The goal is to find the minimum weighted solution that contains the most desirable and least undesirable characteristics.

For example, penalties (i.e. added weight), are applied to undesired path characteristics. A weighted solution may involve for example, penalties for using cross-connections as opposed to using nodes connected via glass-throughs. Similarly, discounts (i.e. less weight) may be applied for example to paths using pre-existing spare capacity as opposed to adding new capacity to the spares network.

Generally, there are three well known approaches for finding alternate routes based on one or more severed spans, namely a path based solution, a link based solution and a segment based solution. Basically, a link based solution only takes into account the nodes that are adjacent to the severed span. Path based solutions take a broader approach by looking at the entire demand path from a source and destination node perspective. The goal of path based solutions is to find the best alternate solution using all of the resources available within the entire communications network. Generally path based algorithms are more sophisticated and render more efficient solutions than link based algorithms. Segment based solutions combine the characteristics of both and link based solutions and consider all possibilities from both approaches. A specific implementation of the present invention may use any of the three preceding approaches to generate a solution.

In this example, a path based solution is used. In this case, many methods are available for finding a minimum weighted path based solution. The details of particular methods that can be used for specific implementations of the present invention will be apparent to those persons skilled in the relevant art(s).

Figure 11:
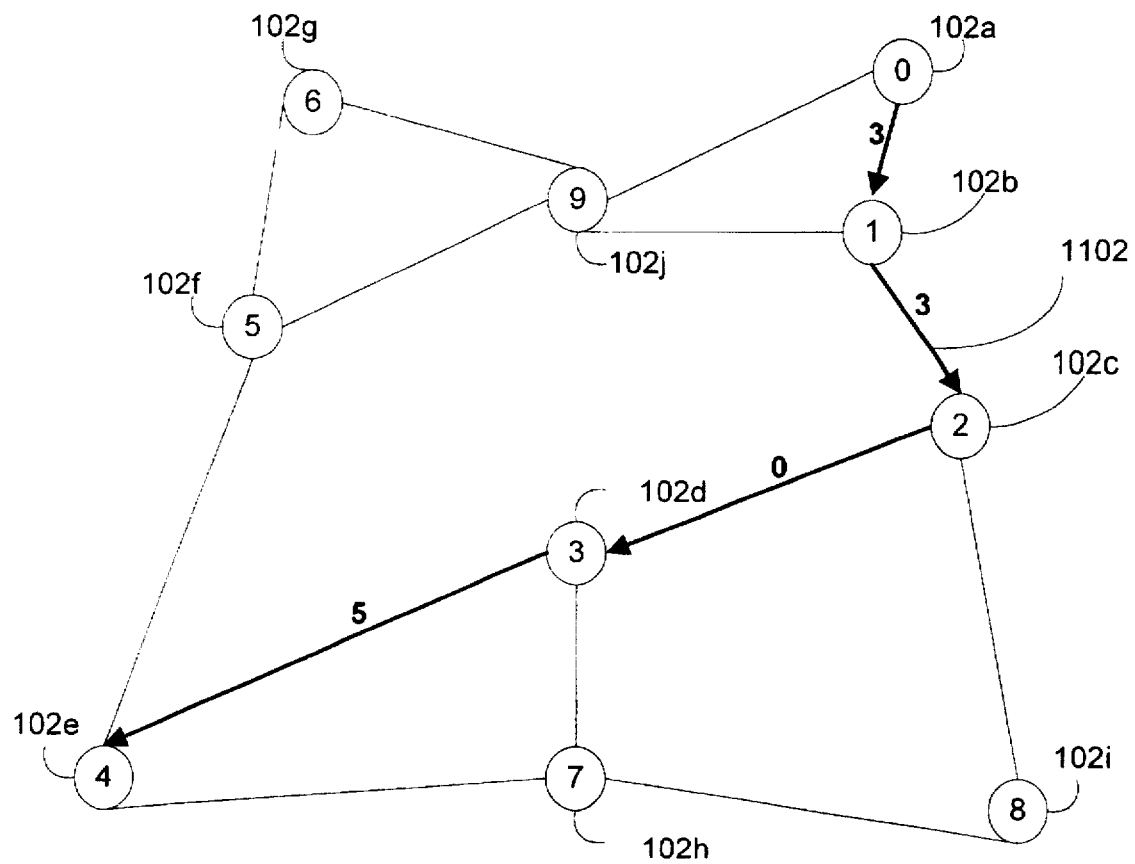

Once an alternate path is determined in step 904, control passes to step 906. In step 906 the routing path from step 904 is examined on a span by span basis. Typically, some of the spans along the path will have zero available spare capacity. These spans are ignored for now. The other spans will have a varying number of available spare capacity. Of these spans with available spare capacity, a number is saved (to be used in the next step) which represents the least available spare capacity. For example, referring now to FIG. 11, the network 100 from FIG. 1 is reproduced. In addition, a routing path (represented by the bold arrows), along the route 102a–102b–102c–102d–102e (hereinafter referred to as 'path 1102') is shown. Suppose that path 1102 is the weighted path based solution determined from step 904. Also depicted in bold characters next to each span is the available spare capacity within each span. Thus, span 102a–102b has an available spare capacity of 3 DS-3s. Likewise, span 102b–102c has 3 spare DS3s, span 102c–102d has 0 spare DS-3s and span 102d–102e has 5 spare DS-3s. Hence using this example, step 906 would determine a resulting capacity of 3 DS-3s, since that is the minimum, non-zero number of available spares in the path 1102.

Next, control passes to step 908. In step 908, the 'remaining unrestored demand flow' is processed. For any particular demand flow, the first time step 908 is processed, the remaining unrestored demand flow is the entire demand capacity. However, as will be seen, the entire demand capacity will not necessarily be restored in one pass of the process 612. Further, the same restoration path may not even be used to restore an entire demand flow. Thus, the term 'remaining unrestored demand flow' is used because the simulated restoration technique used in the process 612 may require multiple passes.

In step 908, the interrupted demand traffic is rerouted via the path from step 904. If the capacity as determined by step 906 is greater than or equal to the capacity of the remaining unrestored demand, then the entire unrestored demand is re-routed. However, if the capacity from step 906 is less than the capacity of the remaining unrestored demand, then only that portion of the demand is rerouted. In any case, the spare resources within the spans which have such spare resources are tagged from 'available' to 'consumed' for the capacity that is re-routed. For the spans that had no available spare capacity, new spare capacity is added (and tagged as consumed), by the amount of flow that is re-routed.

In order to illustrate the process in step 908, again suppose that the path from step 904 is the path 1102. Further suppose that the demand that is being restored has a capacity of 5 DS-3s. Thus, according to step 908, a capacity of 3 out of the 5 DS-3s will be restored using the path 1102, during the first pass of the process 908. This is accomplished by tagging 3 spare DS-3s in each of the spans (with available DS-3s), comprising the path 1102 from 'available' to 'consumed'.

Thus, the 3 spare resources in spans 102a–102b and span 102b–102c are tagged as 'consumed'. Further, 3 out of the 5 spare resources in the span 102d–102 are tagged as 'consumed'. Finally, 3 new spare resources are added to the span 102c–102d and are immediately tagged as 'consumed'.

Next, as step 910 indicates, the process determines whether there is any additional unrestored demand flow. If so, control passes back to step 904 and steps 904–910 are repeated until all of the demand flow has been restored, as described above. Note that in the example used above, since only 3 out of the 5 DS-3s have been restored, control would pass back to step 904 in order to restore the additional demand capacity of 2 DS-3s. Also note that a new path is determined in step 904, and as previously mentioned may not be the same path that was determined during the first pass of the process 612. Finally when all the demand flow has been restored, the process continues with step 912 where control then passes back to step 614 depicted in FIG. 6.

In step 614, the process determines whether there are any additional severed demands in the cutsite list. If so, control passes back to step 612. This process continues until all of the demands for the current cutsite have been processed as described above. When all of the demands have been processed, control passes to step 616.

In step 616, the severed span which represented the cutsite just processed is restored to the network model. Likewise, the spare resources (if any) that have been removed in step 608 are restored to the network model. Next in step 620, the process 600 determines whether there are any more cutsites to process. If so, control passes back to step 604, where steps 604–618 are repeated until the entire set of cutsite lists 702 has been processed in the same fashion as described above. If the set of cutsite lists have all been processed, control passes to step 602 where control returns to the main process (steps 517, 522, or 529), in FIG. 5, depending on which pass (1,2, or 3) of process 500 is taking place.

Note that each cutsite may comprise a single span or may comprise multiple spans. If multiple spans are specified such simulated cuts are referred to as complex cuts. Thus, the examples used herein depicting single span cuts are used only as an example and complex cuts can be used with the present invention as well. This can be accomplished by using different criteria for building the list of cutsites 702. Further, as previously stated, a certain level of restoration (i.e. 100% restoration in case of a single span cut), is also used herein as an example of a preferred embodiment of the present invention. Note that as stated, many different algorithms can be used in step 904 for determining alternate paths. This is one area where the criteria for restoration may be altered for use in different embodiments of the present invention. As such, the specific examples used herein should not be used to limit the scope of the present invention.

Figure 12:
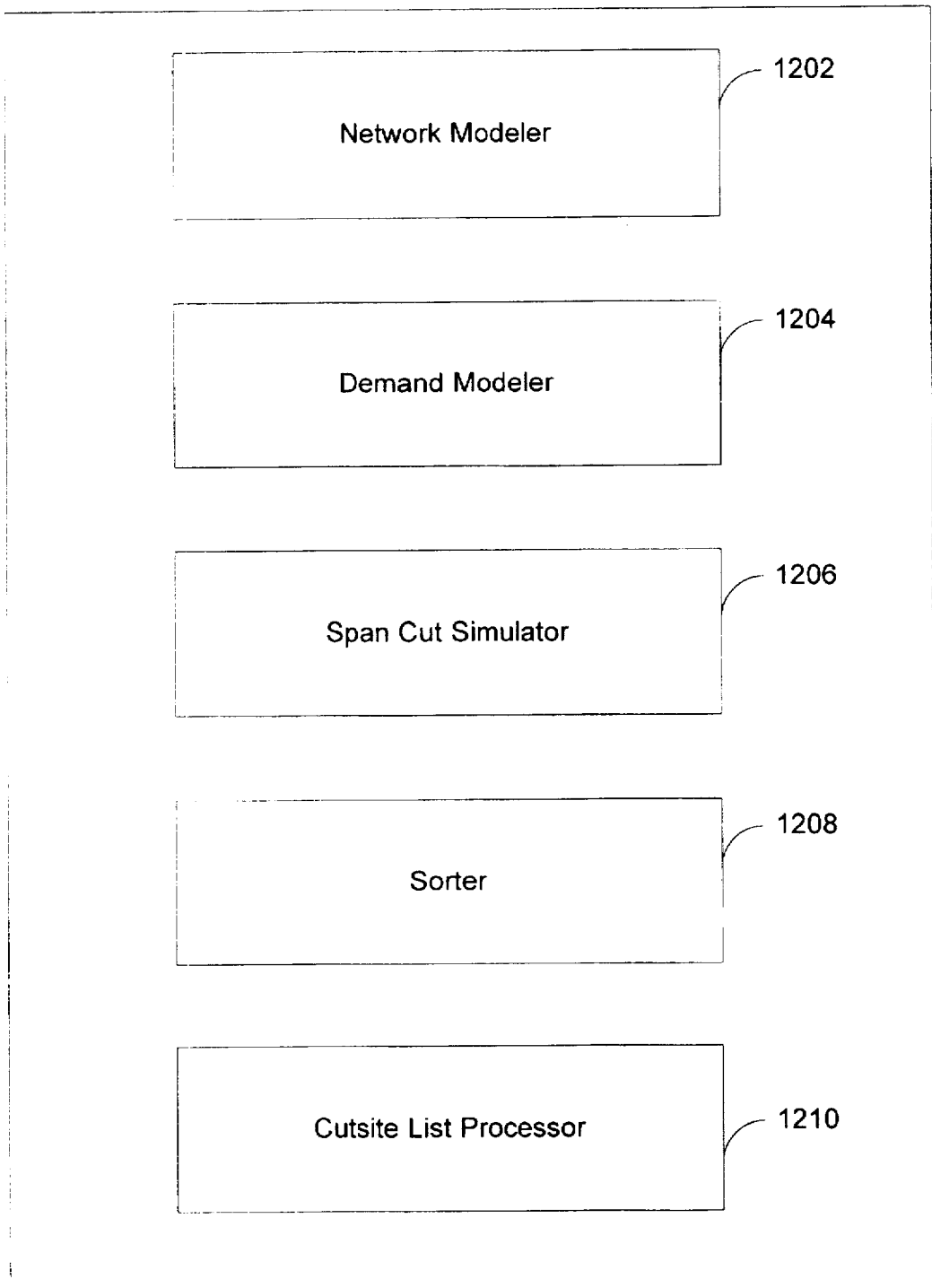
FIG. 12 is a block diagram depicting the details of an embodiment of the present invention.

FIG. 12 is a block diagram depicting the details of an embodiment of the present invention 210, such as the embodiment shown in FIG. 2. The present invention 210 comprises a network modeler 1202, a demand modeler 1204, a span cut simulator 1206, a sorter 1208 and a cutsite list processor 1210. All of these functions have been previously described above and are summarized below. Accordingly, the demand modeler 1204 models the demands of the network in terms of the required capacity to carry specific demand traffic. The span cut simulator 1206 simulates a span cut by removing a span from the network model provided by the network modeler 1202. The sorter 1208 sorts a list of cutsites according to predetermined criteria and the cutsite list processor 1210 derives a spares network by rerouting the affected demands around each simulated cutsite using preexisting spares first, and by purchasing additional spares when no preexisting spares are available.

Figure 10:
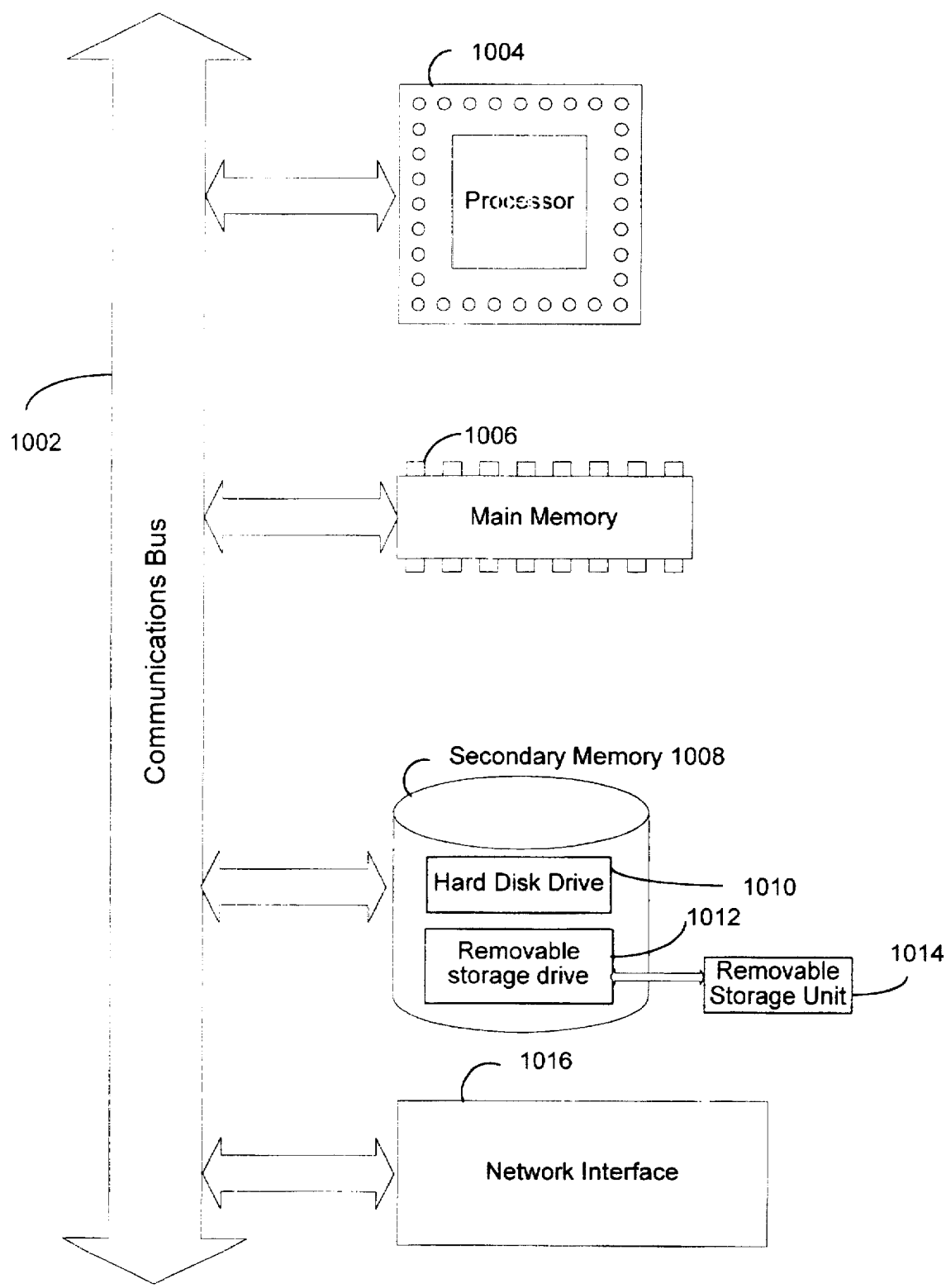
FIG. 10 is a block diagram of a computer useful for implementing an embodiment of the present invention.

In one embodiment, the present invention 210 may be embodied in a general computer system. An exemplary computer system 1001 is shown in FIG. 10. The computer system 1001 includes one or more processors, such as processor 1004. The processor 1004 is connected to a communication bus 1002.

The computer system 1001 also includes main memory 1006, preferably random access memory (RAM), and a secondary memory 1008. The secondary memory 1008 includes, for example, a hard disk drive 1010 and/or a removable storage drive 1012, representing a floppy disk drive, a magnetic tape drive, a compact disk drive, etc. The removable storage drive 1012 reads from and/or writes to a removable storage unit 1014 in a well known manner.

Removable storage unit 1014, also called a program storage device or a computer program product, represents a floppy disk, magnetic tape, compact disk, etc. As will be appreciated, the removable storage unit 1014 includes a computer usable storage medium having stored therein computer software and/or data.

The computer system 1004 also includes a network interface 1016 which provides for communication via the telephone network as discussed herein. Computer programs (also called controllers) are stored in main memory and/or the secondary memory 1008. Such computer programs, when executed, enable the computer system 1001 to perform the features of the present invention discussed herein. In particular, the computer programs, when executed enable the processor 1004 to perform the features of the present invention. Accordingly, such computer programs represent controllers of the computer system 1001.

In another embodiment, the invention is directed to a computer program product comprising a computer readable medium having control logic (computer software) stored therein. The control logic, when executed by processor 1004, causes the processor 1004 to perform the functions of the invention as described herein.

In another embodiment, the invention is implemented primarily in hardware. Implementation of the hardware required to perform these functions described herein will be apparent to persons skilled in the relevant art(s).

Many other variations of embodiments and implementations of the present invention are possible without departing from the principles disclosed herein. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Appendix A

The pseudo code computer program listing below, is a detailed example that can used to implement a preferred embodiment of the present invention. In the pseudo code listing below, Underlines are used to indicate calls to functions, which are presented following the main process. Bold Character Lines are used to indicate that the associated process is typically implemented as separate functions. In addition the bold characters are used to enhance the readability of the pseudo code.

First, the main process is presented. The main process is followed by a list of functions that are called from the main process. These functions call additional functions which are also presented below following the list of the functions called from the main process. Finally, a brief description of the functions associated with each subroutine is presented. Because in this example, nodes are assumed to be implemented with digital cross-connects (DXCs), the terms node (s) and DXC(s) may be used interchangeably.

---

PSEUDO CODE MAIN PROCESS

```
Read network descriptor files
    Fetch run time options and Confirm that node/span/demand files are found
    Count the nodes/spans/demands for later dynamic array-structure allocations
    Load the given network
        Load the given nodes
            Attach a dynamically allocated node array-structure to the network structure
            Open node file
            Confirm the first line sentinel
            While more input lines to read:
                Read next line and convert to uppercase
                Initialize all node attributes to defaults
                Read node name and place it in hashing table with index to current node
            Close node file
        Load the given spans
            Attach a dynamically allocated span array-structure to the network structure
            Open span file
            Confirm the first line sentinel
            While more input lines to read:
                Read next line and convert to uppercase
                Initialize all span attributes to defaults
                Read node1 name and validate it in hashing dictionary
                Store node1 index in span record
                Read node2 name and validate it in hashing dictionary
                Store node2 index in span record
                Read span distance and range validate it
                Store span distance in span record
                If RTR mode:
                    Read span dedicated spare count and store in span record
                    Read span protection spare count abd store in span record
                Increment the Span counts of Node1 and Node2
```

-continued

```
        Close span file
    Interconnect the nodes to spans in the adjacency list
        For every node:
            Create a dynamically allocated adjacency array-structure per the Span count
            Attach the adjacency array-structure to the network structure
            Initialize each cell to the default values
        For every span:
            Load Node1's neighbor with index to Node2
            Load Node2's neighbor with index to Node1
    Load the given demands
        Attach a dynamically allocated demand array-structure to the network structure
        Open demand file
        Confirm first line sentinel
        While more input lines to read:
            Read next line and convert to uppercase
            Initialize all demand attributes to defaults
            If frist character is numeric, read in demand priority
            Read origin node name and validate it in hashing dictionary
            Store origin node index in demand record
            Read destination node name and validate it in hashing dictionary
            Store destination node index in demand record
            Read demand flow (in DS-3s) and range validate it
            Store demand flow in demand record
            If the path field is empty:
                Generate a shortest path route from origin to destination
                Set the route to glass-through all intermediate DXC sites
            Else the path field is not empty:
                Validate the given route
                    insert termination nodes as patched if omitted
                    insert shortest path glass-throughs if gaps between
                    DXCs on a given route
            For the demand route:
                Count the DXC site hops and store
                Attach a dynamically allocated hop array-structure to the
                demand
                For each hop along the route:
                    Store the node index of the next DXC site
                    Store the span index of the traversed span
                    Store the "chooser" node index for the span cut
                    Store whether the hop termination is patched or not
                    Attach demand index to the temporary linked-list for
                    spans
            For each span in the network:
                Attach a dynamically allocated hop array-structure to the network
                structure
                Store the demand index of each demand hop in the temporary linked-
                list
    Load the given complex cuts
        The number of cutsites equals the number of spans (alternatively, complex cuts can be implemented here)
        Attach a dynamically allocated cutsite array-structure to the network structure
        Load cutsite array with one-to-one correspondence to span array indices
        Sort the cutsites sort-indices by the following hierarchy through the severed span:
            1) Ascending order of total demand flows in DS-3
            2) Ascending order of total demand flows that are not glass-throughs
            3) Ascending order of total demand flows that are glass-throughs
            4) Descending order of Distance
    Compute spares network
        Turn off the pass reporting flag
        Identify the run-time mode as: Link, Path, Segment, or RTR
        Pass One: pre-mesh the allocated spares in forward cut-site order
            Initialize the spares network
                For all spans:
                    Spares allocated equals dedicated spares given
                Solve deterministic terminating flow reflections at degree two nodes:
                    For all nodes with exactly two neighbors:
                        Clear an incremental spares build register for both spans
                        For each span connecting the two neighbors:
                            For all demands flowing through the span:
                                if the demand originates or terminates at the node:
                                    Bump spares build for other span by the DS-
                                    3S
                        For each span connecting the two neighbors:
                            If spare build is higher than currently allocated
                            spares:
                                Set currently allocated spares to spare build
                                value
            For all cut-sites in forward order:
                Solve the cut (see functions on next page)
            Copy spares network
                For all spans:
```

Spares memory is set to dedicated spares allocated.
Pass Two: pre-mesh the allocated spares in reverse cut-site order
   Initialize the spares network
     For all spans:
       Spares allocated equals dedicated spares given
     Solve deterministic terminating flows reflections at degree two nodes:
       For all nodes with exactly two neighbors:
          Clear an incremental spares build register for both spans
          For each span connecting the two neighbors:
             For all demands flowing through the span:
                If the demand originates or terminates at the node:
                   Bump spares build for other span by the DS-3S
          For each span connecting the two neighbors:
             If spare build is higher than currently allocated spares:
                Set currently allocated spares to spare build value
   For all cut-sites in reverse order:
     Solve the cut (see functions on next page)
   Keep only dedicated spares common to both runs
     For all spans:
       If spares memory is less than Pass Two dedicated spares allocated:
          Replace dedicated spares allocated with spares memory
Pass Three: Using accumulated pre-mesh, calculate the final spare builds and restoration routes
   Initialize performance measuring variables
   Turn on the pass reporting flag
   For all cut-sites in forward order:
     Solve the cut (see functions on next page)
Report results
   For all spans:
     Accumulate total demand DS-3 flow in all spans
     Accumulate total demand DS-3 flow mileage in all spans
     Accumulate total dedicated spares DS-3 flow in all spans
     Accumulate total dedicated spares DS-3 flow mileage in all spans
   Calculate total spares ports as twice the DS-3 flows since no dedicated spares glass-throughs
   For all demands:
     For each hop in the demand:
       If the arriving port of the hop is patched (end of span or glass-through):
          Accumulate total demand parts with two additional ports for each DS-3 flow
   If "Show Report" option flag is enabled:
     For all spans:
       Print span id, demand DS-3S and mileage, and dedicated spares DS-3S and mileage
   Print final report
     Print title block
     Print dedicated spares to working demand ratio
     Print total demand DS-3 mileage and total dedicated spares DS-3 mileage
     Print total demand DS-3 port count and total dedicated spares DS-3 port count
End

PSEUDO CODE Functions (called from main process)

Solve the Cut
   For all spans:
     Dedicated spares consumed equals zero
     Protection spares consumed equals zero
   Tag the span or spans associated with the cut-site as severed
   For all severed demands associated with the cut-site in previously sorted order:
     Case: Link based restoration
       Restore between nodes: sender to chooser for its DS-3 flow
          While DS-3 flow remaining to be restored:
             Get route from fast Dijkstra using "SMIC" costing
             Send max flow possible until the per flow cost changes
     Case: Path based restoration
       Restore between nodes: origin to destination for its DS-3 flow
          While DS-3 flow remaining to be restored:
             Get route from fast Dijkstra using "SMIC" costing
             Send max flow possible until the per flow cost changes
     Case: Segment based restoration or RTR mode
       Restore between supernodes: the demand for its DS-3 flow
          While DS-3 flow remaining to be restored:
             If RTR Mode and Switchnet Demand:
                Get route from segment Dijkstra using "RTR-SMIC" costing
                Send max Switchnet flow possible until per flow cost changes
             Else: Get route from segment Dijkstra using "SMIC" costing
                Send max flow possible until the per flow cost changes
   Tag the span or spans associated with the cut-site as restored
Return
Get route from fast Dijkstra using ANY costing -continued

```
For all nodes:
   Set shortest path estimate to infinity
   Set node predecessor to empty
   Set span to empty
   Set node tag to unvisited
Set source node's shortest path estimate to zero
Priority Queue Initialization
For all nodes:
   Insert the node into the priority queue
While nodes remain in the priority queue:
   Extract the top (closest) node from the priority queue
   Tag the node as visited
   If the node equals the destination:
      stop and return
   For all spans leading out of the node:
      If the span is unsevered and the adjacent node is unvisited:
         Cost is node's cost plus span cost returned from attached costing function
         If cost through the node is less than the previous best to the adjacent:
            update adjacent node's cost
            update adjacent node's predecessor node to the current node
            update adjacent node's span to the current span
            adjust the adjacent node's position in the priority queue
Return
Get route from Segment Dijkstra using ANY costing
   For all nodes:
      Set shortest path estimate to infinity
      Set node predecessor to empty
      Set span to empty
      Set node tag to unvisited
      Disable node flag to indicate it is NOT within the destination set
   Solve Dijkstra backwards so that predecessor route is from real source to destination
      For all patched DXCs between the origin and the cut:
         Enable node flag to indicate it is within the destination set
      For all patched DXCs between the cut and the destination:
         Set node shortest path estimate to zero
   Priority Queue Initialization
   For all nodes:
      Insert the node into the priority queue
   While nodes remain in the priority queue:
      Extract the top (closest) node from the priority queue
      Tag the node as visited
      If the node flag equals a destination:
         stop and return
      For all spans leading out of the node:
         If the span is unsevered and the adjacent node is unvisited:
            Cost is node's cost plus span cost from attached costing function
            If cost through node is less than previous best to the adjacent:
               update adjacent node's cost
               update adjacent span-traversed to the current span
               update adjacent node's predecessor node to the current node
               adjust the adjacent node's position in the priority queue
Return
```

PSEUDO CODE SUB-FUNCTIONS (called from above Functions)

```
Send max flow possible until the per flow cost changes:
   Set max flow to remaining flow from the demand
   For each span along the restoration path, find the minimum non-zero available spares:
      Available spares are the currently allocated spares minus the currently consumed spares
      Update max flow if available spares are non-zero and less than current max flow
   For each span along the restoration path, allocate new spares if needed to handle max flow:
      Add max flow to spares consumed
      If dedicated spares allocated is less than spares consumed:
         Set dedicated spares allocated to spares consumed (buy new spares if necessary)
Return remaining DS-3 flow to be restored
Send max RTR Switchnet flow possible until per flow cost changes
   Set max flow to remaining flow from the demand
   For each span along the restoration path, find the minimum non-zero available spares:
      Available spares equal available dedicated spares plus available protection spares
      Update max flow if available spares are non-zero and less than current max flow
   For each span along the restoration path, allocate new spares if needed to handle max flow:
      Protection spares used equals the minimum of max flow or available protection spares
      Add protection spares used to protection spares consumed
      Add max flow minus protection spares used to dedicated spares consumed
      If dedicated spares allocated is less than spares consumed:
         Set dedicated spares allocated to spares consumed (buy new spares if necessary)
Return remaining DS-3 flow to be restored
Cost by Distance:
Return span distance
Cost by Hop:
Return 1
```

-continued

```
Cost by SMIC:
    Set distance factor to a constant
    Set hop penalty factor to a constant
    If dedicated spares are available on the span, discount the span costs to attract re-use
        Return (span distance / distance factor + hop penalty)
    If no available spares on the span, then no discount is applied
        Return span distance
Cost by RTR Switchnet SMIC:
    Set distance factor to a constant
    Set hop penalty factor to a constant
    If protection spares are available on the span, discount the span costs to attract re-use
        Return (span distance / distance factor + hop penalty)/2
    If dedicated spares are available on the span, discount the span costs to attract re-use
        Return (span distance / distance factor + hop penalty)
    If no available spares on the span, then no discount is applied
        Return span distance
```

The following is a brief description of the function for each of the subroutines in the above pseudo code listing.

"Solve the Cut"

This function does all restoration for a given cut-site. It will call the two functions listed below to determine restoration routes.

"Get route from fast Dijkstra using ANY costing"

This function finds the most appropriate restoration route based on predefined criteria, between two DXCs given a costing function. The two costing functions used are S/MIC and RTR-S/MIC.

"Get route from Segment Dijkstra using ANY costing"

This is similar to the above function except that it finds the best restoration route between two sets of DXCS; those patched DXCs on either side of the fiber cut.

"Send max flow possible until the per flow cost changes"

Determines how many DS-3s can be routed until the "price changes." Since the next DS-3 is at a different rate, the algorithm stops and re-submits the restoration route function to identify the next best route; often it is better to build elsewhere before adding the next DS-3. It then buys any new spares necessary to establish the restoration.

"Send max RTR Switchnet flow possible until the per flow cost changes"

Similar to above but includes Switchnet rules that bias the first-use of protection spares "Cost by Distance"

Guides restoration by distance alone. This yields all shortest paths restoration "Cost by Hop"

Guides restoration by hop count alone, regardless of fiber distance

"Cost by S/MIC"

Guides restoration to use pre-existing spares before buying new ones

"Cost by RTR Switchnet S/MIC"

Similar to above but includes Switchnet rules that bias the first-use of protection spares

What Is Claimed Is:

1. A method of deriving a minimal spares network for a communications network comprising a plurality of nodes and a plurality of spans interconnecting the nodes, the method comprising the steps of:

(1) inputting a network model describing the physical topology of the network;

(2) inputting demands for the network;

(3) deriving a set of cutsite lists from said network model, wherein each cutsite list identifies at least one span from said plurality of spans, and comprises a list of affected demands that would be interrupted if said at least one span were to be severed;

(4) sorting said set of cutsite lists into a first sorted order according to a predefined sorting criteria;

(5) processing said each cutsite list in said first sorted order to derive a first spares network comprising a first set of spare resources;

(6) processing said each cutsite list in a second sorted order to derive a second spares network comprising a second set of spare resources;

(7) initializing the minimal spares network with an initial set of spare resources that are derived from the spare resources that are common among said first and said second sets of spare resources; and (8) processing said each cutsite list to derive the minimal spares network.

2. The method of claim 1, wherein said processing steps 5,6, and 8, each comprise the steps of:

(a) initializing a resulting spares network from said network model;

(b) for each said cutsite list, simulating at least one severed span by removing said at least one span from said network model;

(c) rerouting each demand in said list of affected demands by using spare resources in said resulting spares network, if available, and by adding new spare resources to said resulting spares network, if no said spare resources are available.

3. The method of claim 2, wherein said rerouting step comprises the steps of (i) determining an alternate route for each said demand;

(ii) identifying zero spans in said alternate route which comprise spans having no available spare resources;

(iii) determining a routing capacity, wherein said routing capacity is equal to the capacity of available spare resources within a single span in said alternate route having the least amount of available spare resources therein, not including said zero spans;

(iv) rerouting the remaining affected demand, up to a maximum capacity equal to the lessor of said routing capacity and said remaining affected demand;

(v) if at least one said zero span is identified in step (2)(b)(ii), adding new spare capacity to said resulting spares network by adding a capacity equal to the capacity rerouted in step (2)(b)(iv) to each of said zero spans.

(vi) if all of said affected demand has not been rerouted, repeat at least steps (2)(b)(i)–(2)(b)(v), until all said affected demand is rerouted.

4. The method of claim 3 wherein step (2)(b)(i) comprises a minimum weighted path based solution.

5. The method of claim 1 wherein said predefined sort criteria includes a total of affected demand capacity within each said cutsite list.

6. The method of claim 1 wherein said network model includes a node data file comprising a list identifying the plurality of nodes within the network.

7. The method of claim 1, wherein said second sorted order is the reverse of said first sorted order.

8. The method of claim 1 wherein said network model includes a span data file comprising a listing for each of said plurality of spans, each said listing includes two interconnecting nodes and a span length.

9. The method of claim 1 wherein said demands comprises a demand data file comprising an entry for each demand, each said entry comprises a source node, a destination node, and a capacity.

10. The method of claim 9 wherein said entry for each demand further comprises routing information.

11. The method of claim 10, wherein said entry for each demand further comprises information relating to whether each node in said routing information is connected via a cross-connection or a bypass connection.

12. A computer program-product storage device readable by a computer system, tangibly embodying a computer program-product comprising instructions executable by the computer system to perform method steps for deriving a minimal spares network for a communications network comprising a plurality of nodes and a plurality of spans interconnecting the nodes, the method comprising the steps of:

(1) inputting a network model describing the physical topology of the network;

(2) inputting demands for the network;

(3) deriving a set of cutsite lists from said network model, wherein each cutsite list identifies at least one span from said plurality of spans, and comprises a list of affected demands that would be interrupted if said at least one span were to be severed;

(4) sorting said set of cutsite lists into a sorted order according to a predefined sorting criteria;

(5) processing said each cutsite list in said sorted order to derive a first spares network comprising a first set of spare resources;

(6) processing said each cutsite list in a reverse sorted order to derive a second spares network comprising a second set of spare resources;

(7) initializing the minimal spares network with an initial set of spare resources that are derived from the spare resources that are common among said first and said second sets of spare resources; and (8) processing said each cutsite list to derive the minimal spares network.

13. The computer program-product storage device of claim 12, wherein said processing steps 5,6, and 8, each comprise the steps of:

(a) initializing a resulting spares network from said network model;

(b) for each said cutsite list, simulating at least one severed span by removing said at least one span from said network model;

(c) rerouting each demand in said list of affected demands by using spare resources in said resulting spares network, if available, and by adding new spare resources to said resulting spares network, if no said spare resources are available.

14. The computer program-product storage device of claim 13, wherein said rerouting step comprises the steps of:

(i) determining an alternate route for each said demand;

(ii) identifying zero spans in said alternate route which comprise spans having no available spare resources;

(iii) determining a routing capacity, wherein said routing capacity is equal to the capacity of available spare resources within a single span in said alternate route having the least amount of available spare resources therein, not including said zero spans;

(iv) rerouting the remaining affected demand, up to a maximum capacity equal to the lessor of said routing capacity and said remaining affected demand;

(v) if at least one said zero span is identified in step (12)(b)(ii), adding new spare capacity to said resulting spares network by adding a capacity equal to the capacity rerouted in step (12)(b)(iv) to each of said zero spans.

(vi) if all of said affected demand has not been rerouted, repeat at least steps (12)(b)(i)–(12)(b)(v), until all said affected demand is rerouted.

15. The computer program-product storage device of claim 14 wherein step (12)(b)(i) comprises a minimum weighted path based solution.

16. The computer program-product storage device of claim 12 wherein said predefined sort criteria includes a total of affected demand capacity within each said cutsite list.

17. The computer program-product storage device of claim 12 wherein said network model includes a node data file comprising a list identifying the plurality of nodes within the network.

18. The computer program-product storage device of claim 12 wherein said network model includes a span data file comprising a listing for each of said plurality of spans, each said listing includes two interconnecting nodes and a span length.

19. The computer program-product storage device of claim 12 wherein said demands comprises a demand data file comprising an entry for each demand, each said entry comprises a source node, a destination node, and a capacity.

20. The computer program-product storage device of claim 19 wherein said entry for each demand further comprises routing information.

21. The computer program-product storage device of claim 20, wherein said entry for each demand further comprises information relating to whether each node in said routing information is connected via a cross-connection or a bypass connection.

22. The computer program-product storage device of claim 21, wherein said each cutsite list further comprises a list of spare resources that would be severed if said at least one span were to be severed.

23. A system for deriving a minimal spares network for a communications network comprising a plurality of nodes and a plurality of spans interconnecting the nodes, the system comprising:

network modeling means for providing a network model that defines the physical topology of the network;

demand modeling means for modeling the demands of the network;

simulator means for simulating a severed span within said network model;

cutsite means for deriving a set of cutsite lists from said network modeling means, wherein each cutsite list identifies at least one span from said plurality of spans, and comprises a list of affected demands that would be interrupted if said at least one span were to be severed;

sorting means for sorting said set of cutsite lists into a first sorted order according to a predefined sorting criteria;

first processing means for processing said each cutsite list in said first sorted order to derive a first spares network comprising a first set of spare resources;

second processing means for processing said each cutsite list in a second sorted order to derive a second spares network comprising a second set of spare resources;

initializing means for initializing the minimal spares network with an initial set of spare resources that are derived from the spare resources that are common among said first and said second processing means; and third processing for processing said each cutsite list to derive the minimal spares network.

24. The system of claim 23, wherein said network modeling means comprises a network modeler.

25. The system of claim 23, wherein said demand modeling means comprises a demand modeler.

26. The system of claim 23, wherein said simulator means comprises a span cut simulator.

27. The system of claim 23, wherein sorting means comprises a sorter.

28. The system of claim 23, wherein said first, second and third processing means each comprises a cutsite list processor.

* * * * *